United States Patent
Kitamura et al.

(10) Patent No.: US 11,333,508 B2
(45) Date of Patent: May 17, 2022

(54) CONGESTION DEGREE ESTIMATION METHOD, NUMBER-OF-PEOPLE ESTIMATION METHOD, CONGESTION DEGREE ESTIMATION PROGRAM, NUMBER-OF-PEOPLE ESTIMATION PROGRAM AND NUMBER-OF-PEOPLE ESTIMATION SYSTEM

(71) Applicant: SCREEN HOLDINGS CO., LTD., Kyoto (JP)

(72) Inventors: Kazuhiro Kitamura, Kyoto (JP); Itaru Furukawa, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 507 days.

(21) Appl. No.: 16/077,711

(22) PCT Filed: Oct. 6, 2016

(86) PCT No.: PCT/JP2016/079750
§ 371 (c)(1),
(2) Date: Aug. 13, 2018

(87) PCT Pub. No.: WO2017/141484
PCT Pub. Date: Aug. 24, 2017

(65) Prior Publication Data
US 2019/0049253 A1 Feb. 14, 2019

(30) Foreign Application Priority Data
Feb. 17, 2016 (JP) .............................. JP2016-027947

(51) Int. Cl.
*G01C 21/34* (2006.01)
*G06Q 50/10* (2012.01)
(Continued)

(52) U.S. Cl.
CPC ......... *G01C 21/3407* (2013.01); *G01C 21/26* (2013.01); *G01C 21/3415* (2013.01);
(Continued)

(58) Field of Classification Search
CPC ....................... G01C 21/3407; G01C 21/3415; G01C 21/26; G08G 1/13; G08G 1/01;
(Continued)

(56) References Cited

U.S. PATENT DOCUMENTS

2010/0177963 A1   7/2010  Yokomitsu et al.
2014/0012539 A1*  1/2014  Takaoka ................ H04W 4/027
                                                              702/160

FOREIGN PATENT DOCUMENTS

CN    101286266 A   10/2008
CN    102968903 A    3/2013
(Continued)

OTHER PUBLICATIONS

Lv et al., "Detecting Traffic Congestions Using Cell Phone Accelerometers" UBICOMP '14 Adjunct, Sep. 13-17, 2014, Seattle, WA, USA (Year: 2014).*
(Continued)

*Primary Examiner* — John C Kuan
(74) *Attorney, Agent, or Firm* — McDermott Will & Emery LLP

(57) ABSTRACT

A method of estimating the congestion degree and the number of people with high accuracy and at a low cost, without requiring a surveillance camera, is provided. Provided are a congestion degree estimating step of estimating a congestion degree based on sensor information (such as acceleration information) of a portable terminal device, an average congestion degree calculating step of calculating an average congestion degree for each mesh (reference range) set in advance, based on the congestion degree estimated in
(Continued)

the congestion degree estimating step for a plurality of portable terminal devices, and an estimated number-of-people calculating step of calculating an estimated number of people for each mesh by multiplying the average congestion degree calculated in the average congestion degree calculating step by a base number of people (maximum number of accommodated people) determined in advance for each mesh.

16 Claims, 16 Drawing Sheets

(51) Int. Cl.
*G08G 1/13* (2006.01)
*G08G 1/01* (2006.01)
*G01C 21/26* (2006.01)
*G06Q 30/02* (2012.01)
*G06Q 10/06* (2012.01)

(52) U.S. Cl.
CPC .......... *G06Q 10/063* (2013.01); *G06Q 30/02* (2013.01); *G08G 1/01* (2013.01); *G08G 1/13* (2013.01); *G06Q 50/10* (2013.01)

(58) Field of Classification Search
CPC .... G08G 1/0133; G08G 1/0141; G08G 1/005; G08G 1/0112; G06Q 30/02; G06Q 10/063; G06Q 50/10
See application file for complete search history.

(56) References Cited

FOREIGN PATENT DOCUMENTS

| | | |
|---|---|---|
| CN | 103649684 A | 3/2014 |
| JP | 2002-269683 A | 9/2002 |
| JP | 2009-110054 A | 5/2009 |
| JP | 2012-194766 A | 10/2012 |
| JP | 2015-165428 A | 9/2015 |
| JP | 2015-207041 A | 11/2015 |
| JP | 2015-219833 A | 12/2015 |

OTHER PUBLICATIONS

Pattara-atikom et al., "Estimating Road Traffic Congestion from Cell Dwell Time using Neural Network" 2007 IEEE (Year: 2007).*
Wakamiya et al., "Crowd-sourced Prediction of Pedestrian Congestion for Bike Navigation Systems" IWGS 'Nov. 4-7, 2014, Dallas/Fort Worth, TX, USA (Year: 2014).*
Fabritiis et al., "Traffic Estimation And Prediction Based On Real Time Floating Car Data" Proceedings of the 11th International IEEE Conference on Intelligent Transportation Systems Beijing, China, Oct. 12-15, 2008 (Year: 2008).*
Chinese Office Action issued in corresponding Chinese Patent Application No. 201680080005.7, dated Sep. 2, 2020, with English translation.
International Search Report issued in corresponding International Patent Application No. PCT/JP2016/079750, dated Dec. 6, 2016, with English Translation.

* cited by examiner

CONGESTION DEGREE DATA

| LATITUDE | LONGITUDE | CONGESTION DEGREE |

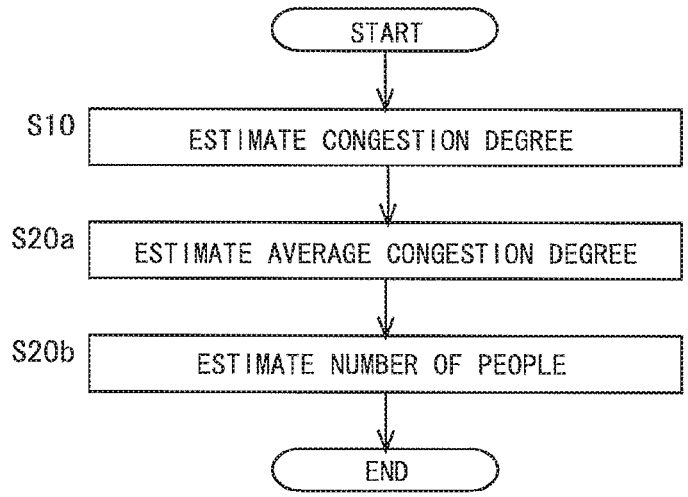

Fig.17
MESH DEFINITION DATA
| MESH NUMBER | LATITUDE OF UPPER LEFT CORNER | LONGITUDE OF UPPER LEFT CORNER | LATITUDE OF LOWER RIGHT CORNER | LONGITUDE OF LOWER RIGHT CORNER |
|---|---|---|---|---|
| | | | | |
Fig.18
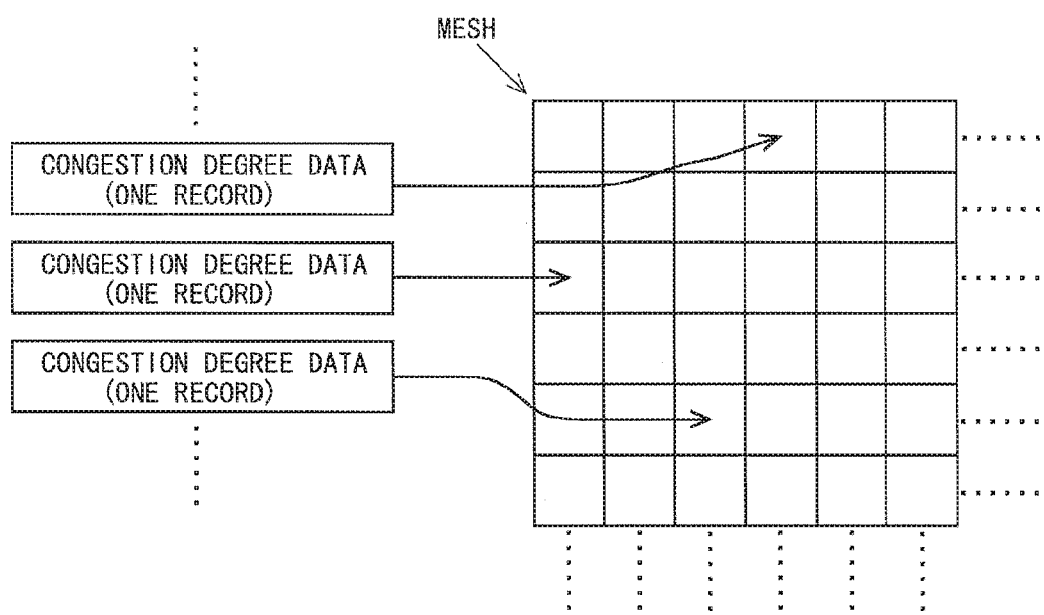
Fig.19
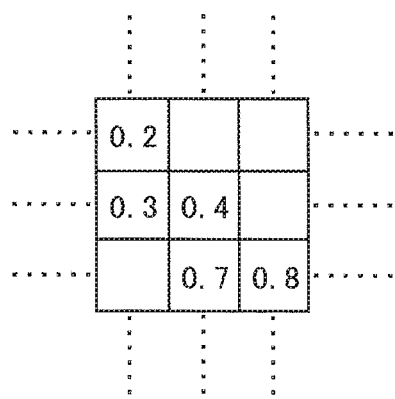

BASE NUMBER-OF-PEOPLE DATA

| MESH NUMBER | BASE NUMBER OF PEOPLE |

ROAD

Fig. 28
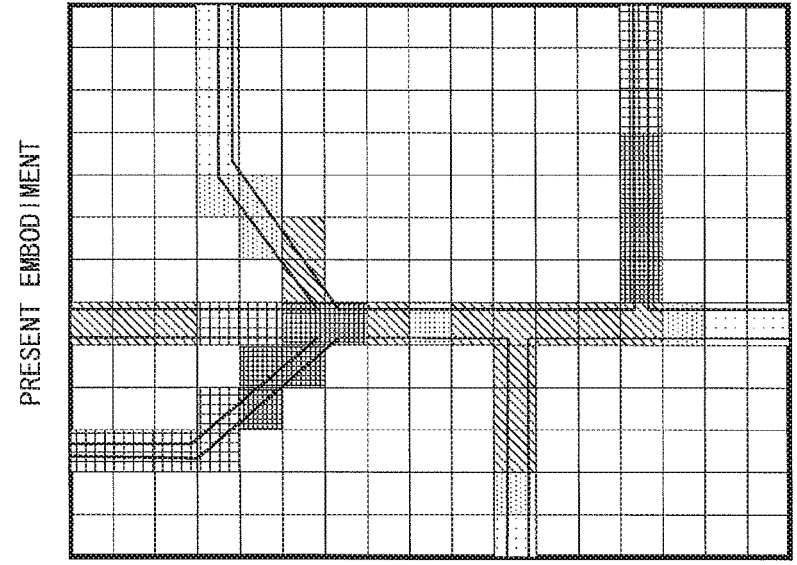
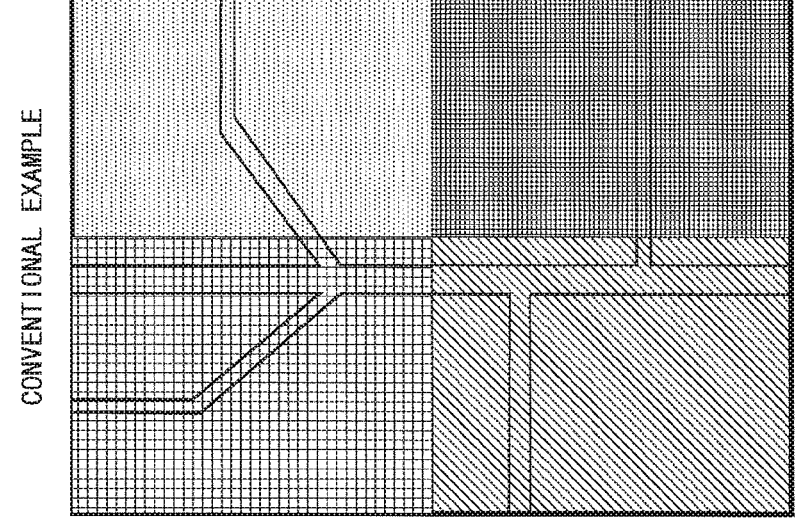

CONGESTION DEGREE ESTIMATION METHOD, NUMBER-OF-PEOPLE ESTIMATION METHOD, CONGESTION DEGREE ESTIMATION PROGRAM, NUMBER-OF-PEOPLE ESTIMATION PROGRAM AND NUMBER-OF-PEOPLE ESTIMATION SYSTEM

CROSS REFERENCE

This application is the U.S. National Phase under 35 US.C. § 371 of International Application No. PCT/JP2016/079750, filed on Oct. 6, 2016, which claims the benefit of Japanese Application No. 2016-027947, filed on Feb. 17, 2016, the entire contents of each are hereby incorporated by reference.

TECHNICAL FIELD

The present invention relates to estimation methods for the congestion degree and the number of people (the number of people within a predetermined range) used by a navigation system and the like.

BACKGROUND ART

In recent years, due to advancement in functionality and increase in resolution of portable terminal devices such as mobile phones, many pieces of application software that use a map are being developed. As one piece of such application software, application software called "route guidance app", for example, for guiding a user of a portable terminal device (hereinafter, referred to as "user") to a destination is known. With the route guidance app, route search from a current location of a user to a destination is performed, and a result is displayed, together with a map, on a screen of a portable terminal device. By using such a route guidance app, a user can easily reach a destination even when there is no map at hand.

Generally, with the route guidance app, search for a shortest time route is performed, in addition to search for a shortest distance route. Furthermore, not only a route is displayed on a screen, but also a predicted required time from a current location to a destination is displayed. Accordingly, with the route guidance application, time required for traveling has to be predicted, and in order to perform prediction taking into account a congestion state of a road, the congestion degree and the number of people have to be estimated.

As methods for estimating the number of people on a road, a method of using positional information that is obtained by a GPS function of a portable terminal device (hereinafter referred to as a "first conventional method"), and a method of using a video of a surveillance camera (hereinafter referred to as a "second conventional method") are known. According to the first conventional method, positional information is acquired from devices, for which the GPS function is set to on, among portable terminal devices of users subscribing to a specific mobile service provider, and the number of people in each predetermined area is estimated based on the proportion of the number of subscribers of the mobile service provider to the total population of Japan. According to the second conventional method, the number of people in a region near a surveillance camera installed on a road or near a road is estimated by performing image processing (such as a process of detecting people from a video and counting the number of human heads) on a video obtained by the surveillance camera.

It should be noted that, in relation to the present invention, the following prior art documents are known. Japanese Laid-Open Patent Publication No. 2009-110054 discloses an invention of a situation determination device configured to determine traveling states of people and the congestion degree based on a temporal change rate of a luminance value in a local region in a captured image of a surveillance camera. Japanese Laid-Open Patent Publication No. 2015-219833 discloses an invention of a congestion degree estimation system configured to calculate the congestion degree in an area where a surveillance camera is not installed, based on an image captured by a wearable terminal.

PRIOR ART DOCUMENTS

Patent Documents

[Patent Document 1] Japanese Laid-Open Patent Publication No. 2009-110054
[Patent Document 2] Japanese Laid-Open Patent Publication No. 2015-219833

SUMMARY OF THE INVENTION

Problems to be Solved by the Invention

According to the first conventional method, only data of subscribers of a specific mobile service provider is used, and also, estimation is performed with reference to the total population of Japan, and thus, the number of people in a small region cannot be accurately estimated. Furthermore, a large amount of data has to be used in estimation in order to increase estimation accuracy, and thus, the estimation of the number of people is inevitably performed for each of relatively large regions. If estimation of the number of people is performed for a large region by a route guidance app, the required time from a current location to a destination is not accurately estimated.

Furthermore, according to the second conventional method, the number of people can be estimated with relatively high accuracy for a region which is captured by the surveillance camera. However, a huge cost is required to install surveillance cameras. Moreover, for example, in tourist sites, installation of surveillance cameras is sometimes not allowed to protect the scenery.

An object of the present invention is therefore to provide a method of estimating the congestion degree and the number of people with high accuracy and at a low cost, without requiring a surveillance camera.

Means for Solving the Problems

A first aspect of the present invention is directed to a congestion degree estimation method including:
an index value acquiring step of acquiring, based on first sensor information, an index value for estimating a congestion degree; and
a congestion degree calculating step of directly calculating the congestion degree from the index value acquired in the index value acquiring step.

According to a second aspect of the present invention, in the first aspect of the present invention,
the first sensor information is acceleration information, and the index value is a standard deviation of acceleration based on the acceleration information.

According to a third aspect of the present invention, in the second aspect of the present invention, the index value acquiring step includes a normalization step of determining a standard deviation as the index value, by performing a predetermined normalization process on the standard deviation of acceleration obtained based on the acceleration information.

According to a fourth aspect of the present invention, in the third aspect of the present invention, the congestion degree estimation method further includes a normalization preparation step of acquiring a standard deviation of acceleration based on the acceleration information over a predetermined period of time before execution of the index value acquiring step, wherein in the normalization step, the normalization process is performed in such a way that a maximum value of the standard deviation acquired in the normalization preparation step is a maximum value that can be taken as the index value.

According to a fifth aspect of the present invention, in any of the second to fourth aspect of the present invention, in the congestion degree calculating step, the congestion degree is calculated in such a way that smaller the standard deviation as the index value, larger the congestion degree.

According to a sixth aspect of the present invention, in any of the first to fifth aspect of the present invention, the congestion degree estimation method further includes a motion determining step of determining, based on second sensor information, whether a user of a portable terminal device is walking or not, wherein acquisition of the index value in the index value acquiring step and calculation of the congestion degree in the congestion degree calculating step are performed only when the user is determined to be walking in the motion determining step.

According to a seventh aspect of the present invention, in the first aspect of the present invention, the first sensor information is any one of acceleration information, angular velocity information, azimuth information, positional information, height information, and number-of-steps information.

According to an eighth aspect of the present invention, in the first aspect of the present invention, the index value is any one of a standard deviation of a value obtained as the first sensor information, number of times the value obtained as the first sensor information exceeds a threshold set in advance, an average value of an absolute value of the value obtained as the first sensor information, a time interval between peak values of a waveform representing a change in the value obtained as the first sensor information, a time interval of the waveform representing a change in the value obtained as the first sensor information intersecting with an axis where a value is zero, speed calculated from the value obtained as the first sensor information, frequency of change in the value obtained as the first sensor information, and a time interval of change in the value obtained as the first sensor information.

A ninth aspect of the present invention is directed to a number-of-people estimation method including:

a congestion degree estimating step of estimating a congestion degree based on sensor information of a portable terminal device;

an average congestion degree calculating step of calculating an average congestion degree for each reference range set in advance, based on the congestion degree estimated in the congestion degree estimating step for a plurality of portable terminal devices; and an estimated number-of-people calculating step of calculating an estimated number of people for each reference range by multiplying the average congestion degree calculated in the average congestion degree calculating step by a maximum number of accommodated people determined in advance for each reference range.

According to a tenth aspect of the present invention, in the ninth aspect of the present invention, the number-of-people estimation method further includes an estimated number-of-people correcting step of correcting the estimated number of people calculated in the estimated number-of-people calculating step, by using a correction filter storing a coefficient group associated with one reference range and reference ranges surrounding the one reference range.

According to an eleventh aspect of the present invention, in the tenth aspect of the present invention, with respect to the correction filter, a value of a coefficient associated with a reference range at a center is greater than values of coefficients associated with reference ranges surrounding the reference range at the center.

According to a twelfth aspect of the present invention, in the eleventh aspect of the present invention, provided that a reference range where there is data about the congestion degree is defined as a calculation target reference range, a certain reference range that is the calculation target reference range is defined as a correction target reference range, a coefficient stored in the correction filter is defined as a filter coefficient, and a value that is obtained by multiplying an estimated number of people before correction for a certain reference range by a filter coefficient that is associated with the certain reference range is defined as a first multiplied value, an estimated number of people after correction for the correction target reference range is calculated in the estimated number-of-people correcting step by a following equation:

$$NP2 = Sum1/Sum2,$$

where NP2 represents the estimated number of people after correction for the correction target reference range, Sum1 represents a sum of first multiplied values of the correction target reference range and calculation target reference ranges surrounding the correction target reference range, and Sum2 represents a sum of respective filter coefficients associated to the correction target reference range and the calculation target reference ranges surrounding the correction target reference range.

A thirteenth aspect of the present invention is directed to a congestion degree estimation program for causing a CPU of a computer to execute, by using a memory:

an index value acquiring step of acquiring, based on first sensor information, an index value for estimating a congestion degree, and a congestion degree calculating step of directly calculating the congestion degree from the index value acquired in the index value acquiring step.

According to a fourteenth aspect of the present invention, in the thirteenth aspect of the present invention, the first sensor information is acceleration information, and the index value is a standard deviation of acceleration based on the acceleration information.

According to a fifteenth aspect of the present invention, in the fourteenth aspect of the present invention, the index value acquiring step includes a normalization step of determining a standard deviation as the index value, by performing a predetermined normalization process on the standard deviation of acceleration obtained based on the acceleration information.

According to a sixteenth aspect of the present invention, in the fifteenth aspect of the present invention, the congestion degree estimation program further includes a normalization preparation step of acquiring a standard deviation of acceleration based on the acceleration information over a predetermined period of time before execution of the index value acquiring step, wherein in the normalization step, the normalization process is performed in such a way that a maximum value of the standard deviation acquired in the normalization preparation step is a maximum value that can be taken as the index value.

According to a seventeenth aspect of the present invention, in any of the fourteenth to sixteenth aspect of the present invention, in the congestion degree calculating step, the congestion degree is calculated in such a way that smaller the standard deviation as the index value, larger the congestion degree.

According to an eighteenth aspect of the present invention, in any of the thirteenth to seventeenth aspect of the present invention, the congestion degree estimation program further includes a motion determining step of determining, based on second sensor information, whether a user of a portable terminal device is walking or not, wherein acquisition of the index value in the index value acquiring step and calculation of the congestion degree in the congestion degree calculating step are performed only when the user is determined to be walking in the motion determining step.

A nineteenth aspect of the present invention is directed to a number-of-people estimation program executed by a server in a number-of-people estimation system where the server and a plurality of portable terminal devices are connected by a network, the program being for causing a CPU of a computer to execute, by using a memory:

a data receiving step of receiving data about a congestion degree transmitted from each portable terminal device;

an average congestion degree calculating step of calculating an average congestion degree for each reference range set in advance, based on data about the congestion degree received in the data receiving step; and an estimated number-of-people calculating step of calculating an estimated number of people for each reference range by multiplying the average congestion degree calculated in the average congestion degree calculating step by a maximum number of accommodated people determined in advance for each reference range.

A twentieth aspect of the present invention is directed to a number-of-people estimation system where a server and a plurality of portable terminal devices are connected by a network, wherein each portable terminal device includes
an index value acquiring means configured to acquire, based on first sensor information, an index value for estimating a congestion degree,
a congestion degree calculating means configured to directly calculate the congestion degree from the index value acquired by the index value acquiring means, and
a data transmitting means configured to transmit, to the server, data about the congestion degree calculated by the congestion degree calculating means, and the server includes
a data receiving means configured to receive the data about the congestion degree transmitted by the data transmitting means of each portable terminal device,
an average congestion degree calculating means configured to calculate an average congestion degree for each reference range set in advance, based on the data about the congestion degree received by the data receiving means, and
an estimated number-of-people calculating means configured to calculate an estimated number of people for each reference range by multiplying the average congestion degree calculated by the average congestion degree calculating means by a maximum number of accommodated people determined in advance for each reference range.

Effects of the Invention

According to the first aspect of the present invention, the congestion degree is calculated directly from the index value that is based on one sensor information (first sensor information). That is, the congestion degree (the congestion degree in an area where the user is walking) can be estimated by using data of only one user of a portable terminal device or the like, without performing complex calculation. Moreover, because there is no need to install an appliance such as a surveillance camera, the congestion degree can be estimated at a low cost.

According to the second aspect of the present invention, the congestion degree is calculated from the standard deviation of the acceleration. Fluctuations in the acceleration tend to change depending on the level of congestion, and thus, the congestion degree can be estimated with high accuracy by using the standard deviation of the acceleration in the calculation of the congestion degree.

According to the third aspect of the present invention, an individual difference in way of walking is taken into account at the time of calculating the congestion degree from the standard deviation of the acceleration. Accordingly, the congestion degree is estimated with even higher accuracy.

According to the fourth aspect of the present invention, the accuracy in estimation of the congestion degree can be further increased.

According to the fifth aspect of the present invention, the same effects as those of the second to the fourth aspects of the present invention can be obtained.

According to the sixth aspect of the present invention, the congestion degree is calculated by using only the data of when the user of the portable terminal device is walking. Accordingly, the congestion degree is calculated by excluding data of the user who is not moving due to taking a photograph, shopping, or the like. The accuracy in estimation of the congestion degree is thereby increased.

According to the seventh aspect of the present invention, information which is obtained from a sensor which is mounted on a recent portable terminal device can be used as the first sensor information.

According to the eighth aspect of the present invention, the index value for estimating the congestion degree can be easily obtained from a sensor which is mounted on a recent portable terminal device.

According to the ninth aspect of the present invention, after the congestion degree is estimated at each portable terminal device, the average congestion degree is calculated for each reference range (for example, each mesh) by using information about the congestion degree estimated at each of a plurality of portable terminal devices. The congestion degree for each portable terminal device can be determined if there is data of one user, and thus, the average congestion degree can also be determined if there is data of one user for a reference range. Accordingly, the congestion degree can be estimated for each of smaller ranges than conventional. Moreover, the number of people is estimated for each reference range by multiplying the average congestion degree by the maximum number of accommodated people. In this manner, not only estimation of the congestion degree is performed, but also estimation of the number of people is performed. Moreover, there is no need to install an appliance such as a surveillance camera in order to estimate the congestion degree and the number of people. Accordingly, congestion information which is more detailed than conventional can be provided to users at a low cost.

According to the tenth aspect of the present invention, by appropriately setting the coefficients in the correction filter, the accuracy in estimation of the number of people can be increased.

According to the eleventh aspect of the present invention, a smoothing process for reducing an unnatural difference in the estimated number of people between adjacent reference ranges is performed. As a result, the accuracy in estimation of the number of people is increased.

According to the twelfth aspect of the present invention, since a reference range where there is no data about the congestion degree is excluded from the calculation target, a smoothing process along the flow of people (along the road) is performed.

According to the thirteenth aspect of the present invention, the same effect as that of the first aspect of the present invention can be obtained.

According to the fourteenth aspect of the present invention, the same effect as that of the second aspect of the present invention can be obtained.

According to the fifteenth aspect of the present invention, the same effect as that of the third aspect of the present invention can be obtained.

According to the sixteenth aspect of the present invention, the same effect as that of the fourth aspect of the present invention can be obtained.

According to the seventeenth aspect of the present invention, the same effect as that of the fifth aspect of the present invention can be obtained.

According to the eighteenth aspect of the present invention, the same effect as that of the sixth aspect of the present invention can be obtained.

According to the nineteenth aspect of the present invention, the same effect as that of the ninth aspect of the present invention can be obtained.

According to the twentieth aspect of the present invention, the same effect as that of the ninth aspect of the present invention can be obtained.

BRIEF DESCRIPTION OF THE DRAWINGS

FIG. 7 is a diagram showing a record format of average congestion degree data according to the embodiment.

FIG. 8 is a diagram showing a record format of estimated number-of-people data according to the embodiment.

FIG. 9 is a flowchart showing a schematic flow of a congestion analysis process according to the embodiment.

FIG. 17 is a diagram showing a record format of mesh definition data according to the embodiment.

FIG. 18 is a diagram schematically showing allocation of the congestion degree data to meshes, according to the embodiment.

FIG. 19 is a diagram for describing the average congestion degree data which is obtained by the average congestion degree calculating means according to the embodiment.

FIG. 28 is a diagram for describing the effect of the embodiment.

MODE FOR CARRYING OUT THE INVENTION

Hereinafter, an embodiment of the present invention will be described with reference to the appended drawings. It should be noted that, in the following, "application software" is abbreviated as "app".

<1. Overall Configuration>

Figure 1:
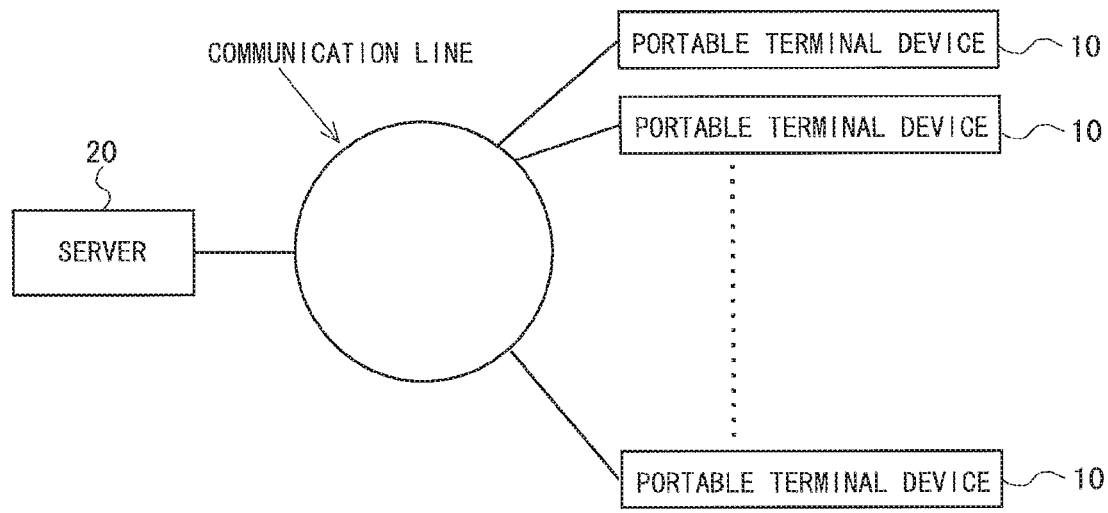
FIG. 1 is a block diagram showing an appliance configuration for realizing a route guidance system according to an embodiment of the present invention.

FIG. 1 is a block diagram showing an appliance configuration for realizing a route guidance system according to an embodiment of the present invention. The route guidance system is realized by a server 20 and a plurality of portable terminal devices 10. The server 20 and the portable terminal devices 10 are connected to each other through a communication line such as the Internet. In the present embodiment, to realize the route guidance system, a route guidance app is installed in the portable terminal devices 10. The route guidance app is software for presenting, to a user, a route from a current location to a destination, when the user travels to a specific destination for sightseeing or shopping, for example. The user may activate the route guidance app by a predetermined operation. By installing such a route guidance app in the portable terminal device 10, the user may easily reach a destination by using the route guidance app even when the user is visiting an unfamiliar tourist site, for example. It should be noted that the route guidance app may include a specialized function for evacuation route guidance. The user may thereby easily reach an evacuation center even if a disaster such as an earthquake strikes when the user is in an unfamiliar place.

As will be described later, the route guidance system performs estimation of the congestion degree and the number of people (the number of people in a predetermined range). That is, a number-of-people estimation system is realized by this route guidance system.

<2. Hardware Configuration>

Figure 2:
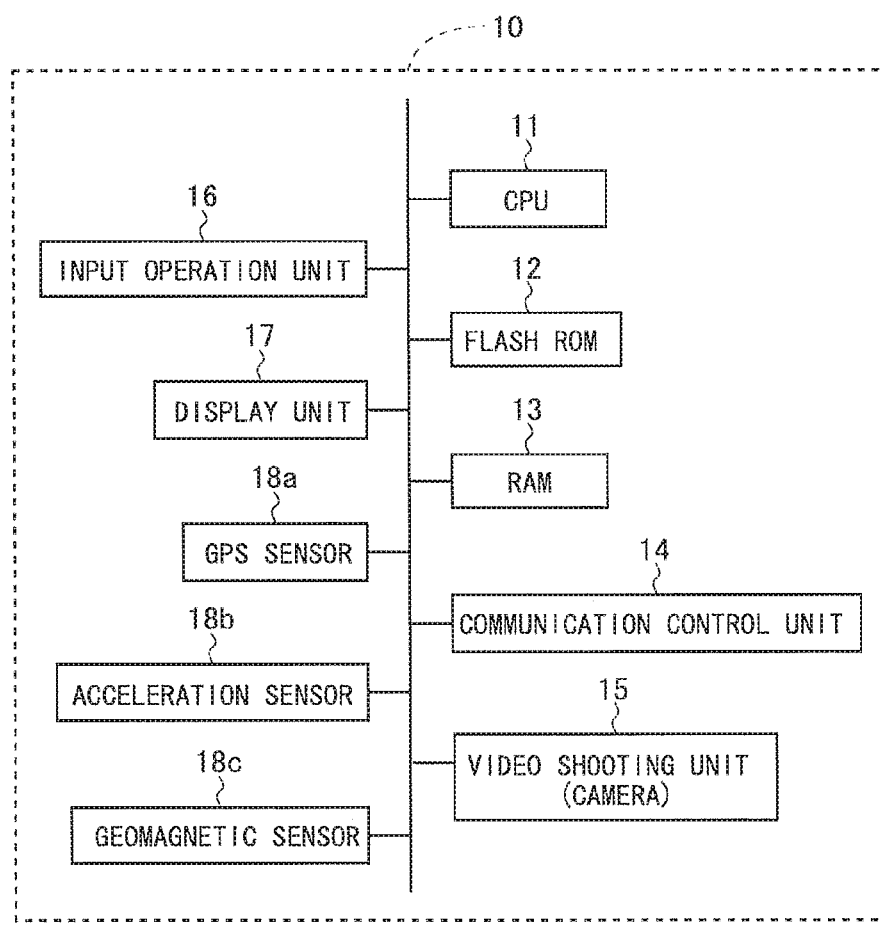
FIG. 2 is a block diagram showing a hardware configuration of a portable terminal device according to the embodiment.

FIG. 2 is a block diagram showing a hardware configuration of the portable terminal device 10. The portable terminal device 10 includes a CPU 11, a flash ROM 12, a RAM 13, a communication control unit 14, a video shooting unit (camera) 15, an input operation unit 16, a display unit 17, a GPS sensor 18a, an acceleration sensor 18b, and a geomagnetic sensor 18c. The CPU 11 performs various types of arithmetic processing to control the entire portable terminal device 10. The flash ROM 12 is a writable non-volatile memory, and stores various programs/various pieces of data which should be kept even when power of the portable terminal device 10 is switched off. The RAM 13 is a writable volatile memory, and temporarily stores a program being executed, data and the like. The communication control unit 14 control s transmission of data to outside, and reception of data from outside. The video shooting unit (camera) 15 captures a view which is seen from a current position, based on an operation by a user. The input operation unit 16 is a touch panel, for example, and receives an input operation from a user. The display unit 17 displays an image based on a command from the CPU 11. The GPS sensor 18a acquires positional information (information about latitude/longitude) for identifying a current position of a user, based on radio waves received from a GPS satellite. The acceleration sensor 18b measures acceleration based on movement of the portable terminal device 10. The geomagnetic sensor 18c acquires azimuth information indicating an azimuth the portable terminal device 10 is facing (such as an azimuth the display unit 17 is facing).

In the portable terminal device 10, a route guidance program for realizing the route guidance app is stored in the flash ROM 12. It should be noted that the route guidance program includes a congestion degree estimation program for estimating the congestion degree. When a user issues an instruction to start the route guidance app, the route guidance program stored in the flash ROM 12 is loaded into the RAM 13, and the CPU 11 executes the route guidance program loaded into the RAM 13, and the function of the route guidance app is thereby provided to the user. Typically, the route guidance program is downloaded to the portable terminal device 10 from a predetermined server (not shown) via a communication line such as the Internet, and is installed in the flash ROM 12 in the portable terminal device 10.

Figure 3:
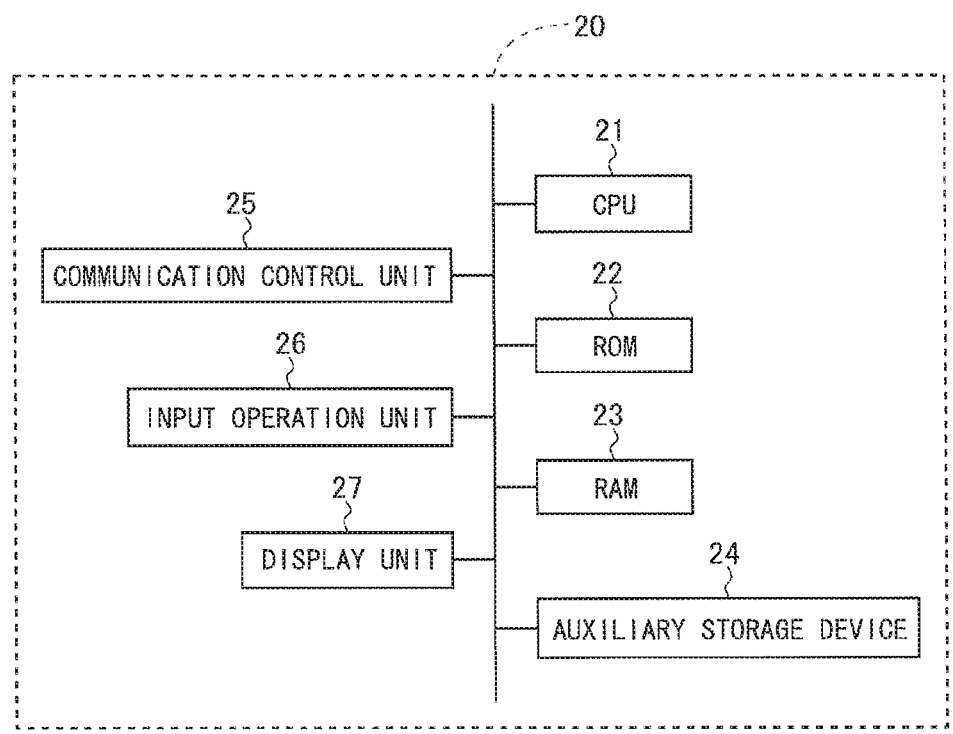
FIG. 3 is a block diagram showing a hardware configuration of a server according to the embodiment.

FIG. 3 is a block diagram showing a hardware configuration of the server 20. The server 20 includes a CPU 21, a ROM 22, a RAN 23, an auxiliary storage device 24, a communication control unit 25, an input operation unit 26, and a display unit 27. The CPU 21 performs various types of arithmetic processing to control the entire server 20. The ROM 22 is a read-only memory, and stores, for example, an initial program which is to be executed by the CPU 21 at the start of the server 20, and the like. The RAM 23 is a writable volatile memory, and temporarily stores a program being executed, data and the like. The auxiliary storage device 24 is a magnetic disk device or the like, and stores various programs/various pieces of data which should be kept even when power of the server 20 is switched off. The communication control unit 25 controls transmission of data to outside, and reception of data from outside. The input operation unit 26 is a keyboard or a mouse, for example, and receives an input operation from an operator. The display unit 27 displays an image based on a command from the CPU 21.

A number-of-people estimation program for estimating the number of people in each mesh is installed in the server 20. It should be noted that the mesh is a region obtained by dividing a geographical region into ranges of a specific size/shape. For example, in the present embodiment, a region which is 20 meters squared is taken as one mesh. In the server 20, the number-of-people estimation program is stored in the ROM 22 or the auxiliary storage device 24. When the server 20 is started, the number-of-people estimation program stored in the ROM 22 or the auxiliary storage device 24 is loaded into the RAM 23, and the CPU 21 executes the number-of-people estimation program loaded into the RAM 23. Estimation of the number of people in each mesh is thereby performed using data which is transmitted from the portable terminal device 10, as will be described later.

<3. Functional Configuration>

Figure 4:
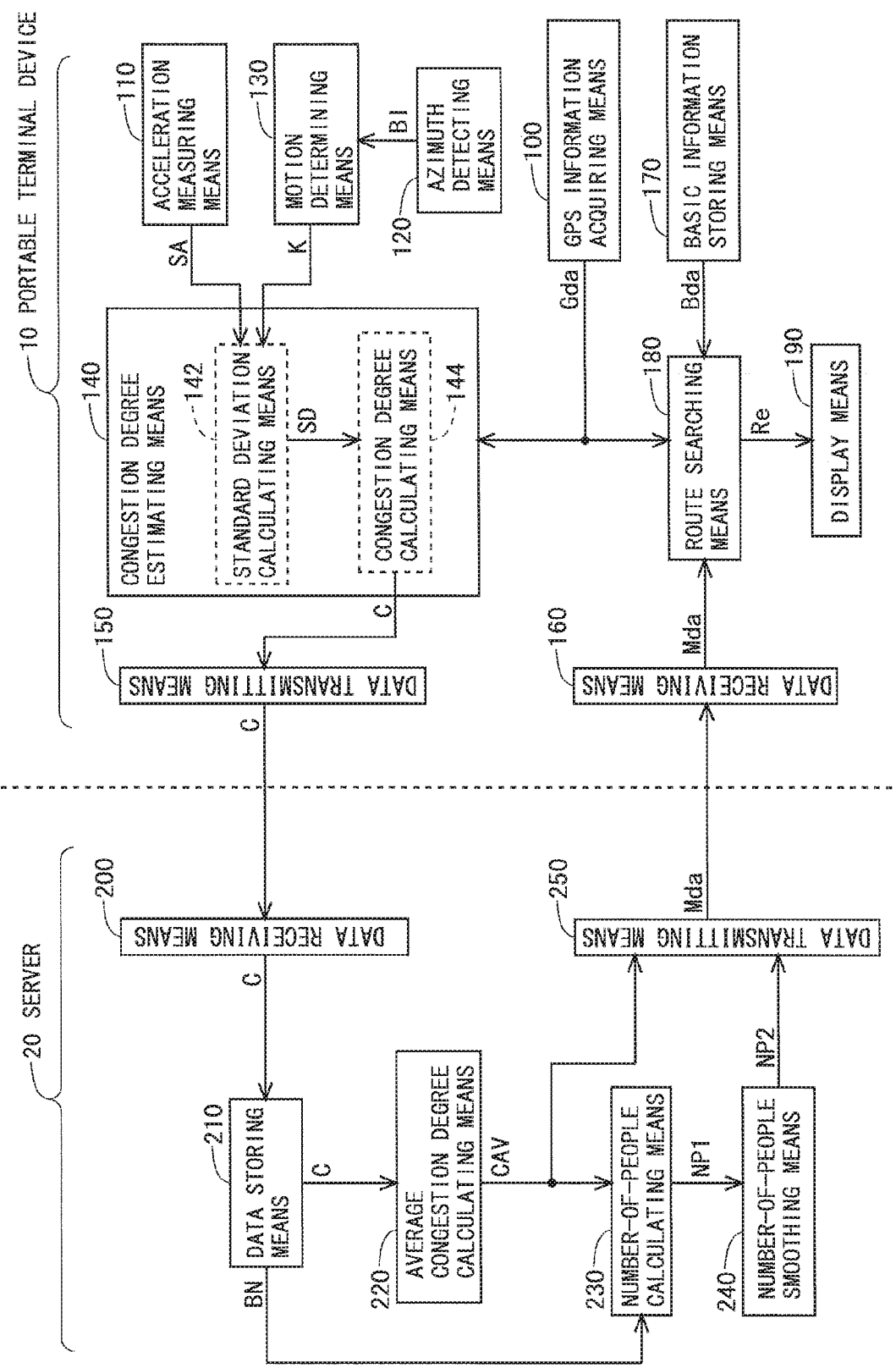
FIG. 4 is a block diagram showing a detailed functional configuration of the route guidance system according to the embodiment.

FIG. 4 is a block diagram showing a detailed functional configuration of the route guidance system. As described above, the route guidance system is realized by the portable terminal devices 10 and the server 20. The portable terminal device 10 includes a GPS information acquiring means 100, an acceleration measuring means 110, an azimuth detecting means 120, a motion determining means 130, a congestion degree estimating means 140, a data transmitting means 150, a data receiving means 160, a basic information storing means 170, a route searching means 180, and a display means 190. The congestion degree estimating means 140 includes a standard deviation calculating means 142, and a congestion degree calculating means 144. The server 20 includes a data receiving means 200, a data storing means 210, an average congestion degree calculating means 220, a number-of-people calculating means 230, a number-of-people smoothing means 240, and a data transmitting means 250.

<3.1 Operation of Component of Portable Terminal Device>

Operation of each component of the portable terminal device 10 will be described. The GPS information acquiring means 100 acquires positional information (information about latitude/longitude) for identifying a current position of a user, based on radio waves received from a GPS satellite, and outputs the information as GPS information Gda. The acceleration measuring means 110 measures acceleration based on movement of the portable terminal device 10 caused by motion of the user, and outputs acceleration data containing, for example, information about a measurement time and information about the acceleration, which is a measured value. It should be noted that, in the present specification, acceleration itself as a measured value and the acceleration data mentioned above are denoted by a same reference character SA for the sake of convenience. The same also applies to the congestion degree and congestion degree data, average congestion degree and average congestion degree data, a base number of people and base number-of-people data, and an estimated number of people and estimated number-of-people data. Measurement of the acceleration SA by the acceleration measuring means 110 is performed every 70 milliseconds, for example. The azimuth detecting means 120 detects an azimuth the portable terminal device 10 is facing, and outputs a detection result as azimuth information BI.

It should be noted that the GPS information acquiring means 100 is realized by the GPS sensor 18*a* as a hardware, the acceleration measuring means 110 is realized by the acceleration sensor 18*b* as a hardware, and the azimuth detecting means 120 is realized by the geomagnetic sensor 18*c* as a hardware (see FIG. 2). Moreover, first sensor information is realized by information about the acceleration obtained by the acceleration measuring means 110, and second sensor information is realized by the azimuth information BI obtained by the azimuth detecting means 120.

Figures 5, 6:
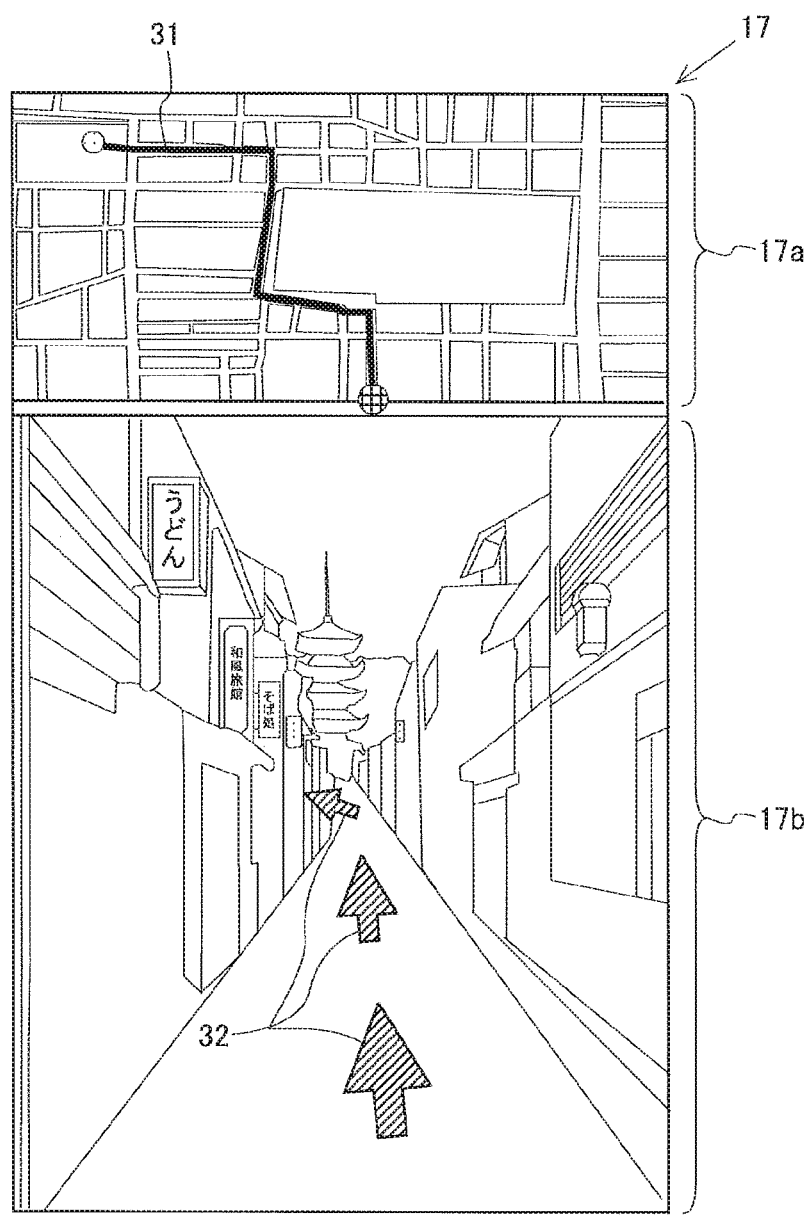
FIG. 5 is a diagram showing a record format of congestion degree data according to the embodiment.
FIG. 6 is a diagram showing an example of a screen displayed on a display unit according to the embodiment.

The motion determining means 130 determines whether the user is walking or not, based on the azimuth information BI, and outputs a determination result K. It should be noted that a detailed description of such determination will be given later. The congestion degree estimating means 140 estimates a congestion degree C. at a position where the user is walking, based on the GPS information Gda, the acceleration SA, and the determination result K obtained by the motion determining means 130, and outputs congestion degree data C containing information about latitude/longitude and information about the congestion degree. More specifically, when the determination result K indicates that the user is walking, the standard deviation calculating means 142 included in the congestion degree estimating means 140 determines a standard deviation SD of the acceleration SA for immediately preceding 10 seconds based on the acceleration data SA, for example. In the present embodiment, index value acquiring means is realized by the standard deviation calculating means 142. Furthermore, the congestion degree calculating means 144 included in the congestion degree estimating means 140 calculates the congestion degree C. based on the standard deviation SD (transforms the standard deviation SD to the congestion degree C.), and outputs the congestion degree data C having a record format as shown in FIG. 5, for example. It should be noted that the manner of determining the standard deviation SD and the manner of determining the congestion degree C. will be described later in greater detail.

The data transmitting means 150 transmits the congestion degree data C to the server 20. Transmission of the congestion degree data C by the data transmitting means 150 is performed every one minute, for example. The data receiving means 160 receives, from the server 20, significant information Mda, which is data useful for route search (search for a route from a current location of the user to a destination performed by the route searching means 180). Basic information Bda, which is necessary at the time of route search, is stored in the basic information storing means 170. The basic information storing means 170 is realized by the flash ROM 12 or the RAM 13 (see FIG. 2) as a hardware. The basic information Bda contains maps, road information, and the like. The road information includes information about a position on each road (information about a start point and an end point), information about a distance from the start point to the end point, and information about a road width, for example. It should be noted that the configuration may be such that the GPS information Gda is transmitted at a certain timing by the data transmitting means 150 to the server 20, and the basic information Bda to be stored in the basic information storing means 170 may be downloaded from the server 20 to the portable terminal device 10.

The route searching means 180 receives user's input of a destination, and searches for a route to the destination based on the GPS information Gda, the significant information Mda, and the basic information Bda. A search result Re for the route obtained by the route searching means 180 is displayed on the display means 190 (display unit 17 in FIG. 2). When route search is performed, a screen as shown in FIG. 6 is displayed on the display unit 17, for example. In the example shown in FIG. 6, a region in the display unit 17 is divided into a region (map display region) 17*a* for displaying a map, and a region (video display region) 17*b* for displaying a video (scenery video) obtained by shooting by the video shooting unit 15 (see FIG. 2). In the map display region 17*a*, a route to the destination is shown by a thick line denoted by a reference character 31, and in the video display region 17*b*, the route to the destination is shown by arrow-shaped air tags (augmented reality image) denoted by a reference character 32.

<3.2 Operation of Component of Server>

Next, operation of each component of the server 20 will be described. The data receiving means 200 receives the congestion degree data C which is transmitted from the portable terminal device 10. The congestion degree data C is stored in the data storing means 210. It should be noted that the congestion degree data C which is received by the data receiving means 200 contains data about various positions (latitude/longitude), and the pieces of data are classified into data for each mesh and are stored in the data storing means 210. In addition to the congestion degree data C, base number-of-people data BN, described later, is stored in the data storing means 210. It should be noted that data (such as the basic information Bda) other than the congestion degree data C and the base number-of-people data BN may also be stored in the data storing means 210.

The average congestion degree calculating means 220 calculates an average congestion degree CAV for each mesh, based on the congestion degree data C stored in the data storing means 210. Average congestion degree data CAV having a record format as shown in FIG. 7, for example, is thereby outputted. The number-of-people calculating means 230 calculates an estimated number of people (the number of people estimated to be currently on a road in each mesh) NP1 for each mesh, based on the base number-of-people data BN stored in the data storing means 210 and the average congestion degree CAV calculated by the average congestion degree calculating means 220. The number-of-people smoothing means 240 performs a smoothing process on the estimated number of people NP1 calculated by the number-of-people calculating means 230 so as to reduce an unnatural difference in the estimated number of people between adjacent meshes. Estimated number-of-people data NP2 having a record format as shown in FIG. 8, for example, is thereby outputted from the number-of-people smoothing means 240. It should be noted that the manner of determining the estimated number of people and the smoothing process will be described later in greater detail.

The data transmitting means 250 transmits the significant information Mda, which is necessary for route search, to the portable terminal device 10. The significant information Mda, which is transmitted to the portable terminal device 10, contains the average congestion degree data CAV and the estimated number-of-people data NP2.

<4. Processing Flow>

The route guidance system according to the present embodiment performs a process of analyzing a state of congestion on a road (hereinafter referred to as a "congestion analysis process"). FIG. 9 is a flowchart showing a schematic flow of the congestion analysis process. First, estimation of the congestion degree at a position where a user is currently present is performed at each portable terminal device 10, by using only the data that is obtained by each portable terminal device 10 (step S10). The congestion degree data C obtained as a result of estimation of the congestion degree at each portable terminal device 10 is transmitted to the server 20. Then, estimation of the average congestion degree (the congestion degree for each mesh) is performed at the server 20, based on the congestion degree data C transmitted from each portable terminal device 10 (step S20a). Then, estimation of the number of people on a per mesh basis is further performed at the server 20 (step S20b). In the following, the process performed by the portable terminal device 10 (process in step S10) and the processes performed by the server 20 (processes in steps S20a, S20b) will be described in greater detail.

<4.1 Process Performed by Portable Terminal Device>

Figure 10:
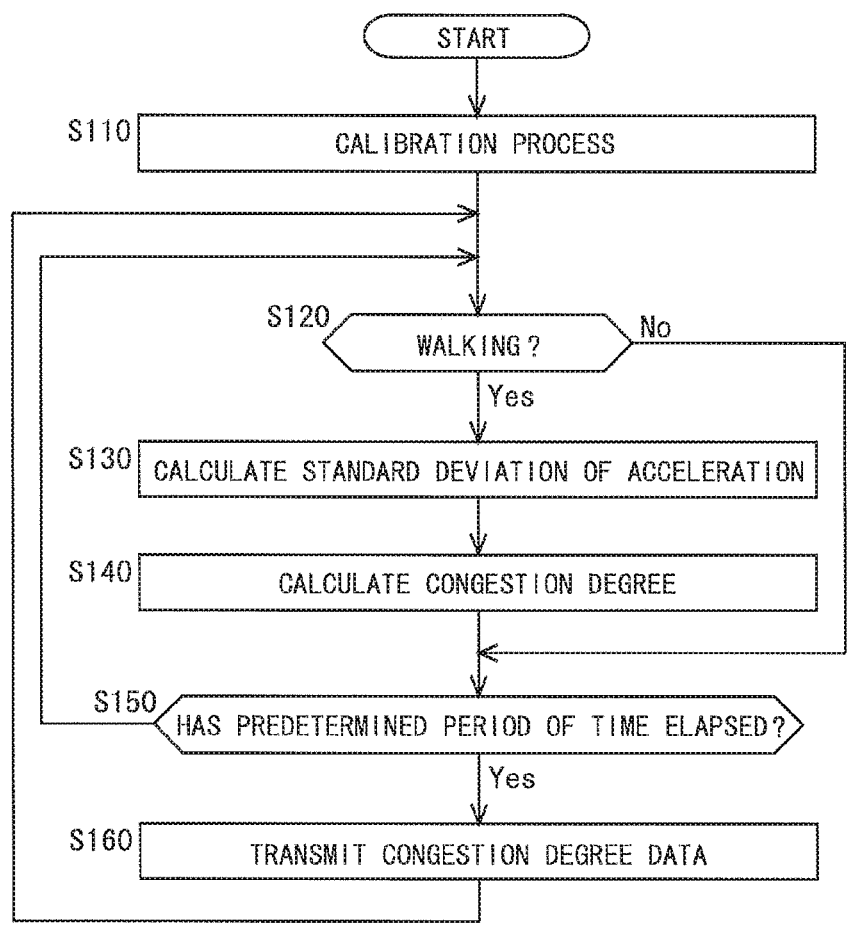
FIG. 10 is a flowchart showing a flow of a process (congestion degree estimation process) performed by a portable terminal device, according to the embodiment.

FIG. 10 is a flowchart showing a flow of a process (congestion degree estimation process) performed by the portable terminal device 10. When the route guidance app is started at the portable terminal device 10, first, a calibration process of acquiring data which is necessary at the time of performing normalization in a process in step S130, described later, is performed (step S110). Detailed description of the calibration process will be given later.

After the calibration process is ended, whether the user of the portable terminal device 10 is walking or not is determined by the motion determining means 130 (step S120). In the present embodiment, the determination is performed based on the azimuth information BI detected by the azimuth detecting means 120. Generally, when a person is walking, the orientation of the body is assumed to be approximately constant. On the other hand, when a person stops to take a photograph or to shop, for example, a change in the orientation of the body is assumed to be great. Accordingly, in the present embodiment, a difference per second in an azimuth obtained from the azimuth information BI is determined, and if the difference is not greater than a predetermined threshold, it is determined that the "user is walking", and if the difference is greater than the predetermined threshold, it is determined that the "user is not walking". As a result of the determination in step S120, if the user is walking, the process proceeds to step S130, and if the user is not walking, the process proceeds to step S150.

Figure 11:
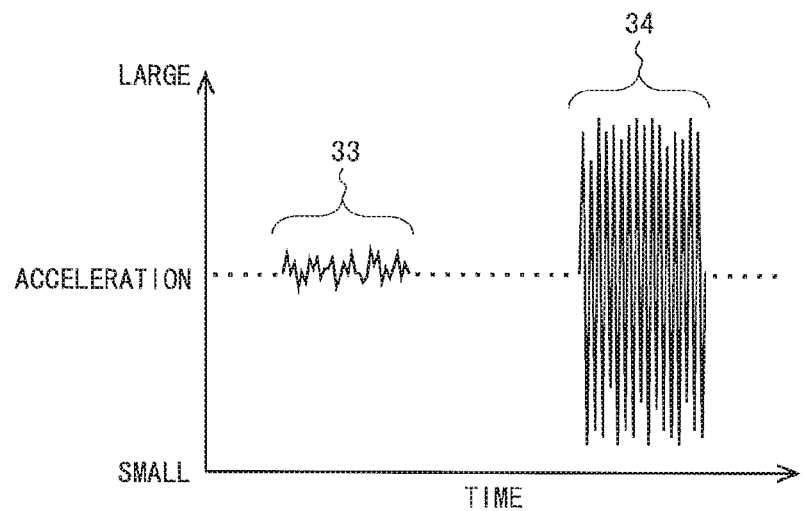
FIG. 11 is a diagram for describing a reason of using a standard deviation of acceleration in estimation of a congestion degree, according to the embodiment.

In step S130, the standard deviation SD of the acceleration SA for immediately preceding 10 seconds is calculated by the standard deviation calculating means 142. The reason why the standard deviation of the acceleration is used in estimation of the congestion degree is described below with reference to FIG. 11. FIG. 11 is a diagram showing an example of a change in the acceleration when a person is walking. When a person is walking in a congested area, steps are small and overall motion is small, and thus, fluctuations in the acceleration are small as shown by a part indicated by a reference character 33 in FIG. 11. On the other hand, when a person is walking in a non-congested area, steps are large and overall motion is great, and thus, fluctuations in the acceleration are great as shown by a part indicated by a reference character 34 in FIG. 11. In this manner, fluctuations in the acceleration change depending on the level of congestion. Accordingly, estimation of the congestion degree is performed using the standard deviation (of the acceleration) as an index of fluctuations in the acceleration.

Figure 12:
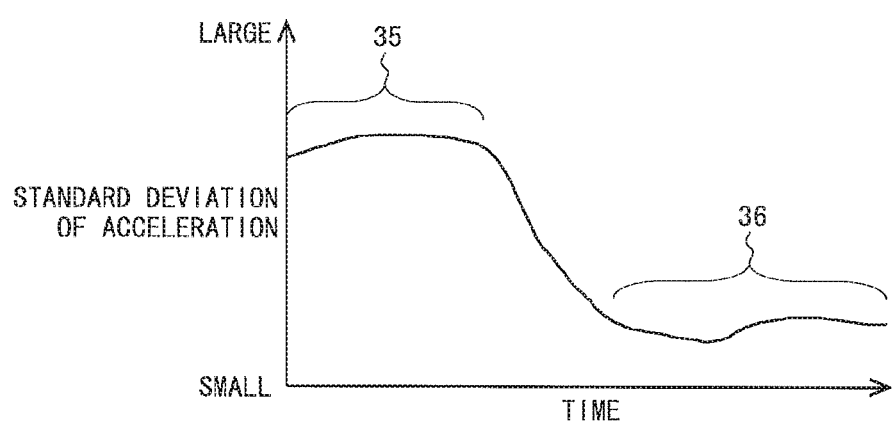
FIG. 12 is a diagram showing an example of a change in the standard deviation of acceleration when a person is walking, according to the embodiment.

FIG. 12 is a diagram showing an example of a change in the standard deviation of acceleration when a person is walking. In a time period indicated by a reference character 35 in FIG. 12, the standard deviation of the acceleration takes a relatively large value. In this time period, the person is considered to be walking in a relatively non-congested area. On the other hand, in a time period indicated by a reference character 36 in FIG. 12, the standard deviation of the acceleration takes a relatively small value. In this time period, the person is considered to be walking in a relatively congested area.

Meanwhile, since each person has individuality, the way of walking varies from person to person. Hence, even if the standard deviation of acceleration is the same for pieces of data on given two users, it does not necessarily mean that their levels of congestion are the same. In particular, it is considered that the characteristics of human walking emerge when walking in a non-congested area. Therefore, it is considered that the maximum value of the standard deviation of acceleration varies from person to person. Note that it is considered that when the place is so congested that people cannot move, the standard deviation of acceleration is substantially 0 for most people. In view of this, in the present embodiment, in order to absorb differences in the way of walking between people, normalization is performed for each portable terminal device 10 such that the maximum value of the standard deviation of acceleration is 1.0. For this normalization, the calibration process (step S110) is performed.

Figure 13:
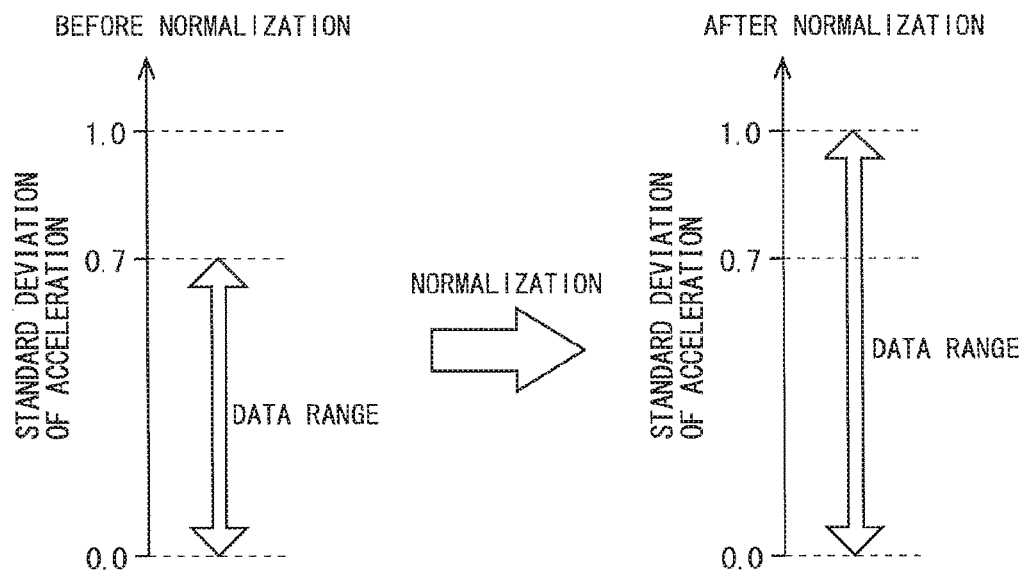
FIG. 13 is a diagram for describing normalization of the standard deviation according to the embodiment.

In the calibration process, standard deviation of acceleration is obtained, for example, every 10 seconds for a predetermined period (e.g., 10 minutes) after the activation of the route guidance app. Then, the maximum value of the standard deviation obtained during the predetermined period is set as a normalized value corresponding to 1.0. For example, it is assumed that the maximum value of standard deviation of acceleration is 0.7 as a result of a calibration process. In this case, at step S130, as shown in FIG. 13, normalization is performed such that values in a range from 0.0 to 0.7 become values in a range from 0.0 to 1.0.

Figure 14:
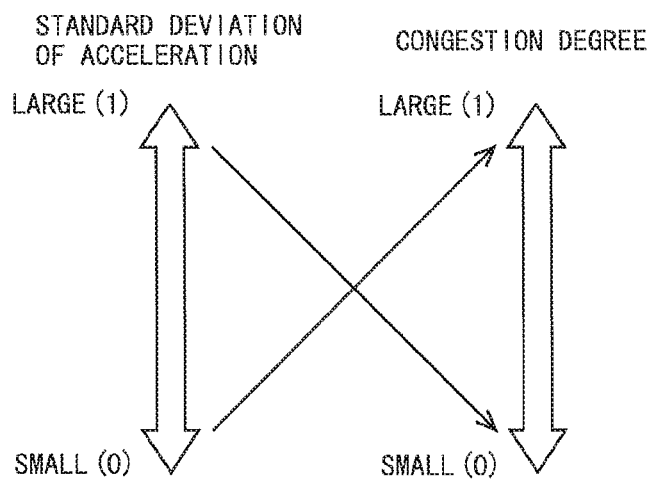
FIG. 14 is a diagram for describing transformation from the standard deviation to the congestion degree, according to the embodiment.

After calculating the standard deviation SD of acceleration SA in the above-described manner, the congestion degree calculating means 144 calculates a congestion degree C. based on the standard deviation SD (step S140). In the present embodiment, the congestion degree C. is represented by a value from 0 to 1. The closer the value of the congestion degree C. to 1, the greater the level of congestion. Meanwhile, as described above, the standard deviation SD of acceleration SA is small when a person is walking in a congested area, and is large when a person is walking in a non-congested area. Thus, at step S140, as shown in FIG. 14, the congestion degree C. is calculated such that the closer the standard deviation SD of acceleration SA is to 1, the closer the congestion degree C. is to 0, and the closer the standard deviation SD of acceleration SA is to 0, the closer the congestion degree C. is to 1. More specifically the congestion degree C. is calculated by the following Equation (1).

Congestion degree=1−standard deviation (1)

Figure 15:
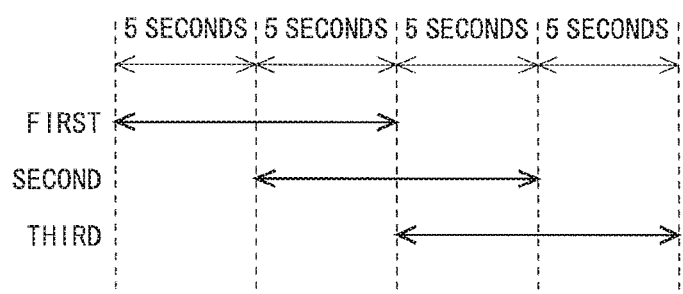
FIG. 15 is a diagram for describing frequency of a process of calculating the congestion degree, according to the embodiment.

Meanwhile, as described above, in step S130, the standard deviation SD of the acceleration SA for immediately preceding 10 seconds is calculated. That is, one round of calculation of the congestion degree C. is performed by using data for 10 seconds. However, calculation of the congestion degree C. is performed not every 10 seconds, but every 5 seconds. That is, as shown in FIG. 15, a second half of data for 5 seconds used in first calculation of the congestion degree C. and a first half of data for 5 seconds used in second calculation of the congestion degree C. overlap each other, and a second half of data for 5 seconds used in the second calculation of the congestion degree C. and a first half of data for 5 seconds used in third calculation of the congestion degree C. overlap each other. The congestion degree C. with real-time property is thus determined.

After calculation of the congestion degree C., whether or not a predetermined period of time (such as one minute) has passed is determined (step S150). As a result of the determination, if the predetermined period of time has passed, the process proceeds to step S160, and if the predetermined period has not yet passed, the process returns to step S120.

In step S160, the congestion degree data C accumulated during the predetermined period of time is transmitted from the portable terminal device 10 to the server 20. If no congestion degree data C is accumulated, transmission of the congestion degree data C to the server 20 is not performed. After transmission of the congestion degree data C to the server 20, the process returns to step S120. Then, processes from step S120 to step S160 are repeated until the route guidance app is ended.

It should be noted that, in the present embodiment, a normalization preparation step is realized by step S110, a motion determining step is realized by step S120, an index value acquiring step is realized by step S130, and a congestion degree calculating step is realized by step S140.

<4.2 Process Performed by Server>

Figure 16:
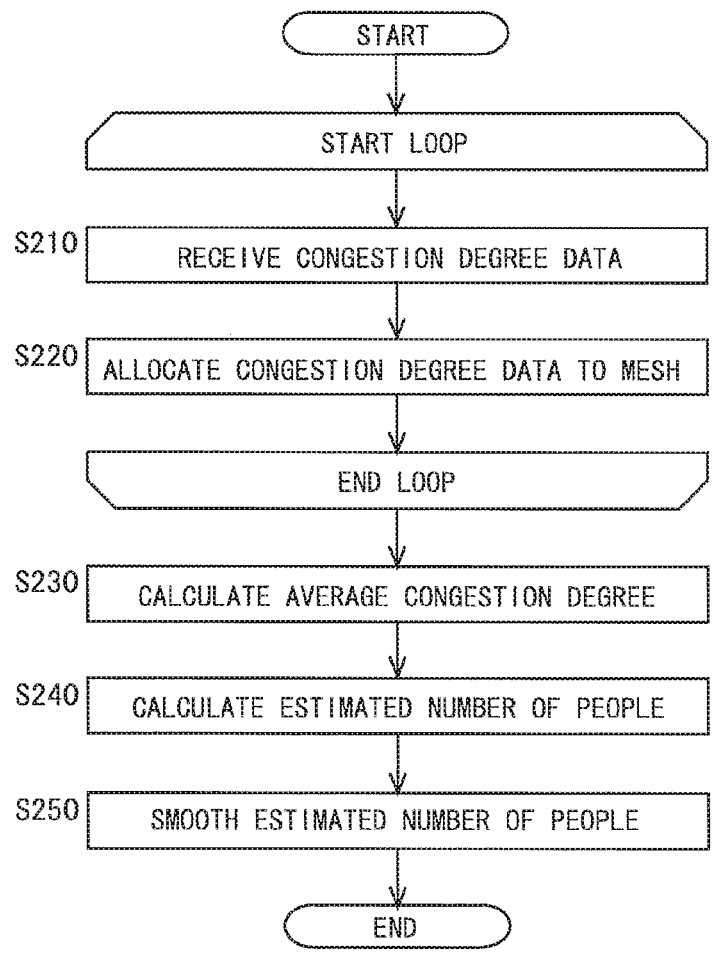
FIG. 16 is a flowchart showing a flow of a process (number-of-people estimation process) performed by a server, according to the embodiment.

FIG. 16 is a flowchart showing a flow of a process (number-of-people estimation process) performed by the server 20. At the server 20, first, a process of accumulating the congestion degree data C transmitted from each portable terminal device 10 is performed (steps S210 and S220). More specifically, the congestion degree data C transmitted from each portable terminal device 10 is received (step S210), and the received congestion degree data C is allocated to a corresponding mesh (step S220). The processes in steps S210 and S220 are performed every time the congestion degree data C is transmitted from the portable terminal device 10, until a lapse of a predetermined period of time (such as 15 minutes) from previous execution of the number-of-people estimation process.

Now, allocation (classification) of congestion degree data C to a mesh will be described. One record of congestion degree data. C which is transmitted from a portable terminal device 10 includes information about latitude/longitude and information about the congestion degree (see FIG. 5). In addition, the server 20 pre-holds, as data that defines each mesh, mesh definition data having a record format such as that shown in FIG. 17, for example. As shown in FIG. 17, the mesh definition data includes information about the latitude/longitude of the upper left corner of each mesh and information about the latitude/longitude of the lower right corner of the mesh. From the above, by referring to the mesh definition data, each record of congestion degree data C can be allocated to a corresponding mesh as schematically shown in FIG. 18. Note that it is also possible to prepare a conversion equation for obtaining a mesh number from information about latitude/longitude, and allocate each record of congestion degree data C to a corresponding mesh based on the conversion equation.

After a lapse of a predetermined period of time (such as 15 minutes) from previous execution of this number-of-people estimation process, the average congestion degree CAV for each mesh is calculated based on the accumulated congestion degree data C by the average congestion degree calculating means 220 (step S230). For example, if three pieces of congestion degree data C, namely, "congestion degree=0.1", "congestion degree=0.15", and "congestion degree=0.35", are accumulated for a certain mesh, the average congestion degree CAV for this mesh is 0.2. In this manner, data of the average congestion degree CAV for each mesh is obtained as schematically shown in FIG. 19. It should be noted that calculation of the average congestion degree CAV is not performed for a mesh for which there is no data about the congestion degree C. A blank mesh in FIG. 19 is a mesh for which calculation of the average congestion degree CAV is not performed.

Figures 20, 21, 22:
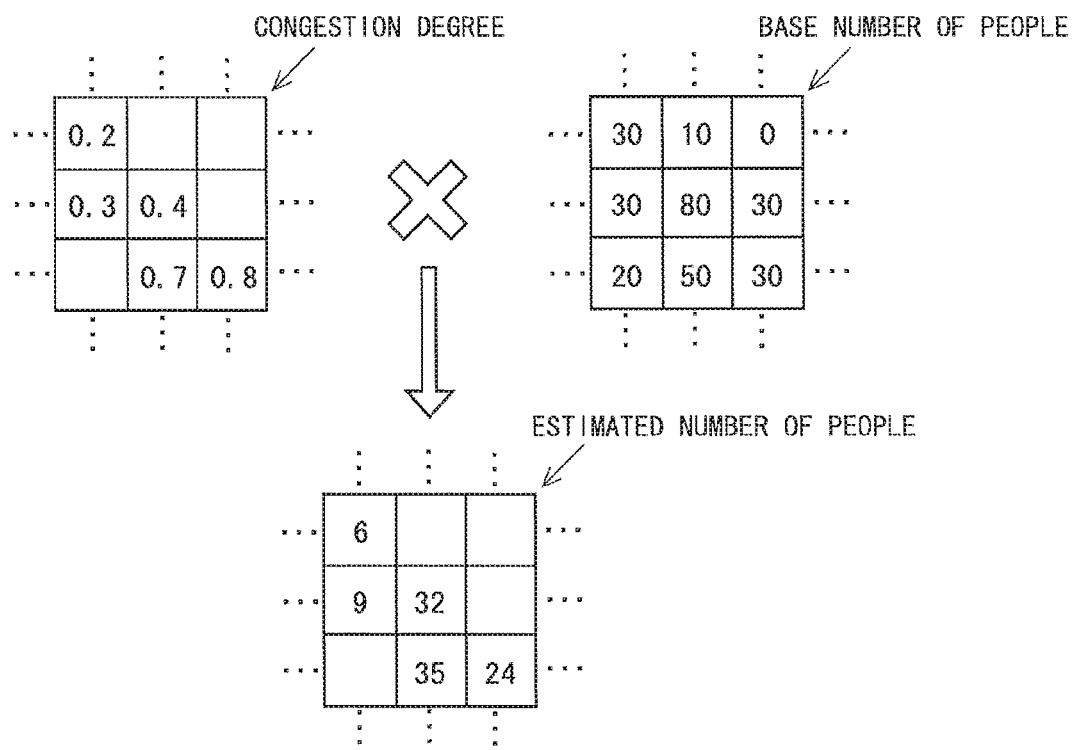
FIG. 20 is a diagram showing a record format of base number-of-people data according to the embodiment.
FIG. 21 is a diagram schematically showing the base number-of-people data according to the embodiment.
FIG. 22 is a diagram for describing calculation of an estimated number of people according to the embodiment.

After calculation of the average congestion degree CAV, an estimated number of people NP1 for each mesh is calculated by the number-of-people calculating means 230 (step S240). The base number of people BN is used in the calculation of the estimated number of people NP1. The base number of people BN is information about a maximum number of accommodated people indicating how many people can be present on a road in each mesh at one time point. For example, the base number of people BN is determined based on an area occupied by the road in each mesh. Additionally, in the present embodiment, it is assumed that the base number-of-people data BN is prepared in advance. For example, the base number-of-people data BN has a record format as shown in FIG. 20, and is stored in advance in the data storing means 210. In step S240, the estimated number of people NP1 is calculated for each mesh by multiplying the average congestion degree CAV calculated in step S230 by the base number of people BN. That is, the estimated number of people NP1 is calculated for each mesh by the following Equation (2).

Estimated number of people=average congestion degree×base number of people (2)

For example, in the case where the average congestion degree CAV for each mesh is determined as shown in FIG. 19, and the base number of people BN for each mesh is determined as shown in FIG. 21, the estimated number of people NP1 for each mesh is calculated as shown in FIG. 22.

After calculation of the estimated number of people NP1 for each mesh, the smoothing process is performed by the number-of-people smoothing means 240 (step S250). The smoothing process is described below. Since past data for about 15 minutes, for example, is used in calculating the estimated number of people NP1 in step S240, a large number of users move mesh to mesh in a period from when the congestion degree data C is acquired from each portable terminal device 10 to when the estimated number of people NP1 is calculated. Accordingly, an unnatural difference may be caused between adjacent meshes with respect to the estimated number of people NP1. For example, focusing on one road having a certain width, the state of congestion is assumed to gradually change mesh to mesh, but according to the estimated number of people NP1 acquired in step S240, the estimated number NP1 may change greatly between two certain adjacent meshes. Accordingly, in the present embodiment, the estimated number of people NP1 acquired in step S240 is corrected to reduce an unnatural difference in the estimated number of people between adjacent meshes.

Figure 23:
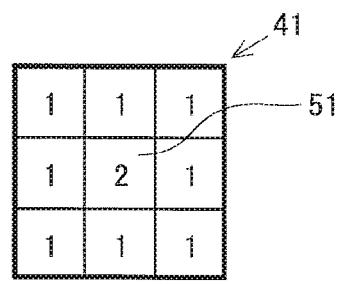
FIG. 23 is a diagram for describing a smoothing process according to the embodiment.

A corrected estimated number of people NP2 for a certain mesh is determined based on the estimated number of people NP1 before correction for this mesh and the estimated number of people NP1 before correction for meshes around this mesh. A correction filter 41 as shown in FIG. 23 is used at this time. Coefficients (hereinafter referred to as "filter coefficient") associated to one mesh and eight surrounding meshes are stored in the correction filter 41. Moreover, only the data of a mesh for which there is the congestion degree data C is used in calculation of the estimated number of people NP2. By excluding a mesh for which there is no congestion degree data C from a calculation target, a smoothing process along a flow of people (along the road) is performed.

When a mesh for which there is the congestion degree data C is defined as a calculation target mesh, a certain mesh which is a calculation target mesh is defined as a correction target mesh, and a value obtained by multiplying the estimated number of people NP1 before correction for a certain mesh by the filter coefficient associated with this mesh is defined as a first multiplied value, the estimated number of people NP2 after correction for the correction target mesh is calculated in step S250 by the following Equation (3).

$$NP2 = Sum1/Sum2 \quad (3)$$

In Equation (3), "Sum1" represents a sum of the first multiplied values of the correction target mesh and the surrounding calculation target meshes, and "Sum2" represents a sum of the respective filter coefficients associated to the correction target mesh and the surrounding calculation target meshes.

Figure 24:
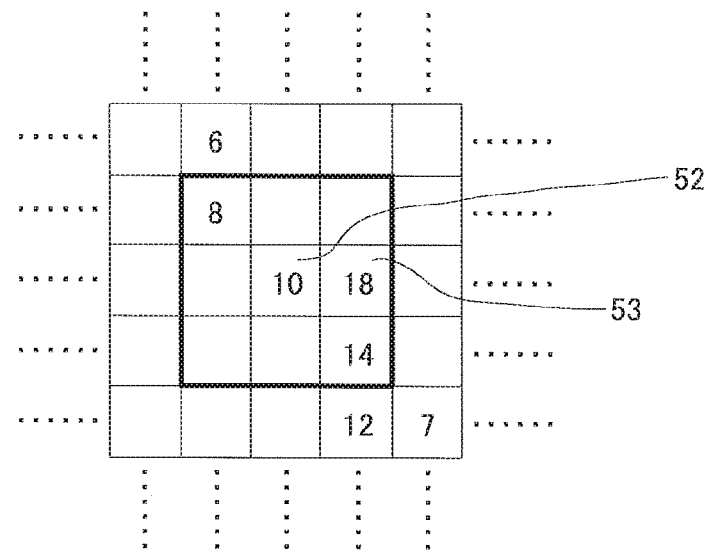
FIG. 24 is a diagram for describing the smoothing process according to the embodiment.
Figure 25:
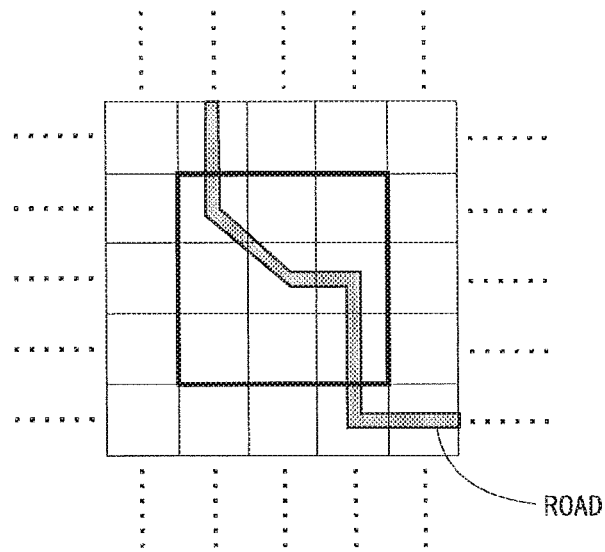
FIG. 25 is a diagram for describing the smoothing process according to the embodiment.

For example, it is assumed that a calculation result of the estimated number of people NP1 for each mesh as shown in FIG. 24 is obtained in step S240. It should be noted that the mesh for which the calculation result of the estimated number of people NP1 is obtained in FIG. 24 is a mesh for which there is the congestion degree data C. In this example, a road is present in the manner shown in FIG. 25, for example. At the time of correcting the estimated number of people NP1 for a mesh denoted by a reference character 52 in FIG. 24, the mesh denoted by the reference character 52 in FIG. 24 is associated with a mesh at a center of the correction filter 41 (i.e., a mesh denoted by a reference character 51 in FIG. 23). Then, in the case of this example, the estimated number of people NP2 after correction is calculated by the following Equation (4).

$$NP2 = (8 \times 1 + 10 \times 2 + 18 \times 1 + 14 \times 1)/5 \quad (4)$$

Figure 26:
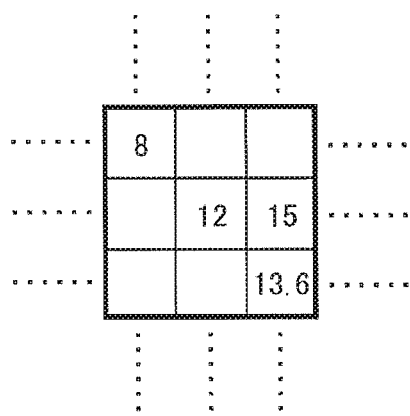
FIG. 26 is a diagram for describing the smoothing process according to the embodiment.

When the estimated number of people NP2 is calculated for meshes in a thick frame in FIG. 24 in the same manner, a calculation result of the estimated number of people NP2 for each mesh as shown in FIG. 26 is obtained. It can be seen from FIGS. 24 to 26 that a change in the estimated number of people along the road is made smooth by the correction. When the estimated number of people NP2 is calculated in the above manner for all the calculation target meshes, one round of number-of-people estimation process (processes of steps S210 to S250) is ended.

It should be noted that, in the present embodiment, an average congestion degree calculating step is realized by step S230, an estimated number-of-people calculating step is realized by step S240, and an estimated number-of-people correcting step is realized by step S250. Moreover, step S20a in FIG. 9 corresponds to steps S210 to S230 in FIG. 16, and step S20b in FIG. 9 corresponds to steps S240 to S250 in FIG. 16.

<5. Effects>

According to the present embodiment, at each portable terminal device 10, the standard deviation SD of the acceleration SA obtained by the acceleration measuring means 110 (acceleration sensor 18b) is calculated, and the standard deviation SD is subjected to simple transformation to determine the congestion degree C. In this manner, by using data of one user, the congestion degree C. (the congestion degree C. in an area where the user is walking) can be determined, without performing complex calculation. Furthermore, at the server 20, the average congestion degree CAV for each mesh is calculated by using the congestion degree data C transmitted from a plurality of portable terminal devices 10. Since the congestion degree C. can be determined if there is data of one user as described above, the congestion degree can be estimated for each of smaller ranges than conventional. That is, more detailed congestion information can be provided to users than conventionally possible. Moreover, because the congestion degree data C obtained by each portable terminal device 10 is aggregated at the server 20 in each of a relatively short period of time, congestion information with real-time property can be provided to users.

Figure 27:
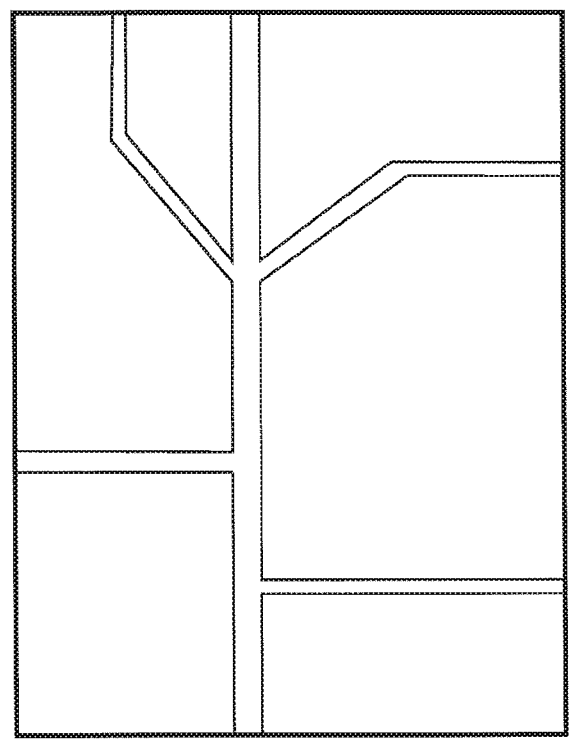
FIG. 27 is a diagram for describing an effect of the embodiment.

Furthermore, according to the present embodiment, at the server 20, the number of people is estimated for each mesh by multiplying the average congestion degree CAV by the base number of people (maximum number of accommodated people). In this manner, not only the congestion degree is estimated, but the number of people is also estimated. Since the average congestion degree CAV for each mesh can be determined if there is data of one user for each mesh, the number of people can be estimated for each of smaller ranges than conventional. For example, with respect to an area with road data as shown in FIG. 27, although information about the number of people for each of relatively large ranges (for example, each of ranges of 500 meters squared) could be provided to users in the past, information about the number of people for each of small ranges (for example, each of ranges of 20 meters squared) can be provided to users in the present embodiment, as shown in FIG. 28.

Furthermore, according to the present embodiment, at the time of estimating the number of people, the smoothing process for reducing an unnatural difference in the estimated number of people between adjacent meshes is performed. In this smoothing process, a mesh where there is no data about the congestion degree is excluded from the calculation target. Accordingly, the smoothing process along a flow of people (along the road) is performed, and the accuracy in estimation of the number of people can be increased.

Moreover, according to the present embodiment, the congestion degree C. is calculated by using only the data of when the motion determining means 130 determines that a "user is walking". Because calculation of the congestion degree C. is performed by excluding data of a user who is not moving due to, for example, taking a photograph or shopping, the accuracy in estimation of the congestion degree C. can be increased.

As described above, according to the present embodiment, the congestion degree and the number of people can be estimated with high accuracy and at a low cost, without requiring a surveillance camera.

<6. Modifications>

In the following, modifications of the embodiment described above will be described.

<6.1 Modification Regarding Motion Determination>

In the embodiment described above, determination of whether a user is walking or not (step S120 in FIG. 10) is performed based on the azimuth information BI. However, the present invention is not limited to such a case. For example, the determination may be performed based on angular velocity obtained by a gyro sensor. In this case, as in the embodiment described above, the configuration may be such that, if a difference per second of obtained data is not greater than a predetermined threshold, it is determined that the "user is walking", and if the difference is greater than the predetermined threshold, it is determined that the "user is not walking".

Furthermore, in recent years, depending on the portable terminal device, a function for detecting motion of a user (such as a motion activity function installed in iPhone (registered trademark), which is a product of Apple Inc.) is provided. When using this function, information such as "user is not moving", "user is walking", "user is moving on bicycle", and "user is traveling by car" can be obtained. Accordingly, the determination may be performed by using this function.

<6.2 Modification Regarding Index Value for Estimating Congestion Degree>

In the embodiment described above, the standard deviation SD is calculated from the acceleration SA obtained by the acceleration measuring means 110, and estimation of the congestion degree C. is performed by using the standard deviation SD. However, the present invention is not limited to such a case. That is, the index value for estimating the congestion degree C. is not limited to the standard deviation SD. In the following, various modifications regarding the index value for estimating the congestion degree C. will be described.

<6.2.1 Number of Times Exceeding Threshold>

As described above, when a person is walking in a non-congested area, steps are large and overall motion is great, and thus, fluctuations in the acceleration are great as shown by the part indicated by the reference character 34 in FIG. 11. Assuming here that an appropriate threshold is provided, the number of times the acceleration SA (measured value obtained by the acceleration measuring means 110) exceeds the threshold during a predetermined period of time is dependent on a scale of walking motion. In other words, the number of times the acceleration SA exceeds the threshold during a predetermined period of time depends on the congestion degree C. Accordingly, the number of times the acceleration SA exceeds the threshold during a predetermined period of time may be used as the index value for estimating the congestion degree C. In this case, the smaller the number of times the acceleration SA exceeds the threshold during a predetermined period of time, the larger the value of the congestion degree C. calculated by the congestion degree calculating means 144. It should be noted that the configuration may be such that a plurality of thresholds are provided and the congestion degree C. is determined based on the number of times the acceleration SA exceeds each threshold during a predetermined period of time.

<6.2.2 Average Value of Absolute Values>

When a person is walking in a non-congested area, fluctuations in the acceleration are great (see the part indicated by the reference character 34 in FIG. 11). Values of the acceleration take positive and negative values, and it can be seen from FIG. 11 that an absolute value of the acceleration also becomes large when the fluctuations in the acceleration are great. Accordingly, the average value of the absolute values of the acceleration SA may be used as the index value for estimating the congestion degree C. In this case, the smaller the average value of the absolute values of the acceleration SA, the larger the value of the congestion degree C. calculated by the congestion degree calculating means 144.

<6.2.3 Maximum Value or Minimum Value>

When a person is walking n a congested area, fluctuations in the acceleration are small as shown by the part indicated by the reference character 33 in FIG. 11, and when a person is walking in a non-congested area, fluctuations in the acceleration are great as shown by the part indicated by the reference character 34 in FIG. 11. It can be seen from FIG. 11 that a maximum value of the acceleration is small when the fluctuations in the acceleration are small, and that the maximum value of the acceleration is large when the fluctuations in the acceleration are great. Accordingly, the maximum value of the acceleration SA may be used as the index value for estimating the congestion degree C. In this case, the smaller the maximum value of the acceleration SA, the larger the value of the congestion degree C. calculated by the congestion degree calculating means 144. In the same manner, a minimum value of the acceleration SA may be used as the index value for estimating the congestion degree C. In this case, the larger the minimum value of the acceleration SA, the larger the value of the congestion degree C. calculated by the congestion degree calculating means 144.

<6.2.4 Time Intervals Between Peak Values of Waveform>

Figure 29:
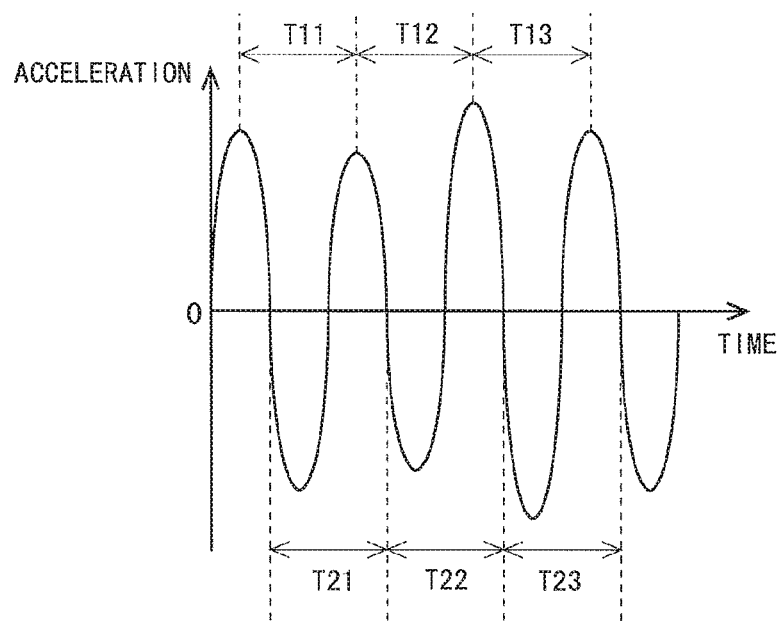
FIG. 29 is a diagram for describing time intervals between peak values of a waveform showing a change in acceleration, according to a modification of the embodiment.
Figure 30:
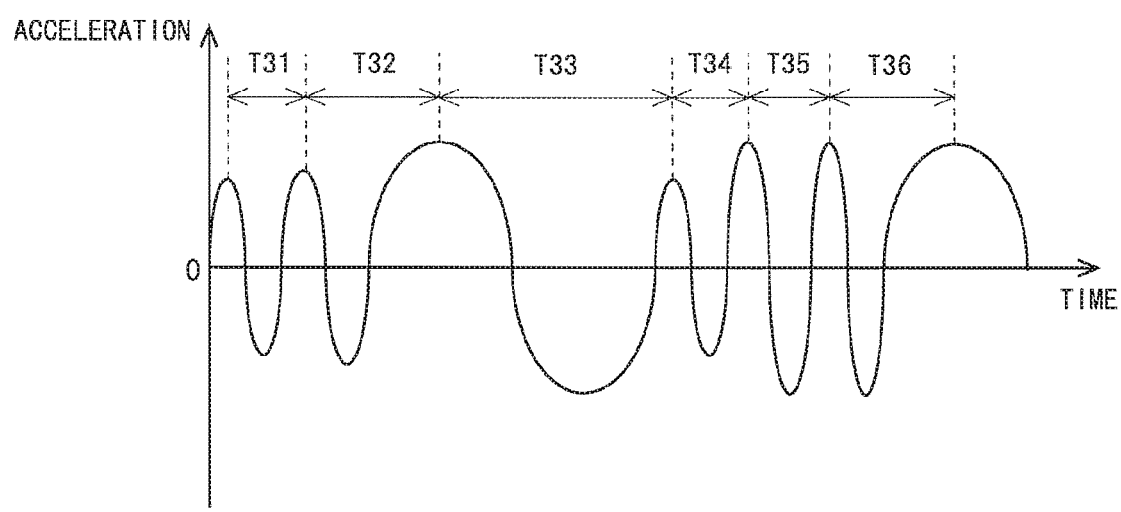
FIG. 30 is a diagram for describing time intervals between peak values of a waveform showing a change in acceleration, according to the modification of the embodiment.

When the acceleration SA (measured value) obtained by the acceleration measuring means 110 is represented in a graph, change in the acceleration SA is represented by a waveform as shown in FIG. 29. As shown in FIG. 29, peak values appear in the waveform at certain timings. Time intervals (time lengths T11 to T13) between the peak values are dependent on a scale of walking motion and regularity in the walking motion. Furthermore, the scale of the walking motion and the regularity in the walking motion are dependent on a state of congestion on a road. Accordingly, the time intervals between the peak values are dependent on the state of congestion on a road. Accordingly, the time intervals between the peak values of the waveform of the acceleration SA may be used as the index value for estimating the congestion degree C. In this case, for example, the shorter the time intervals between the peak values, the larger the value of the congestion degree C. calculated by the congestion degree calculating means 144. Furthermore, if the time intervals (time lengths T31 to T36) between the peak values are irregular as shown in FIG. 30, it is assumed that the road is congested. Accordingly, the greater the irregularity in the time intervals between the peak values, the larger the congestion degree C. calculated by the congestion degree calculating means 144.

<6.2.5 Time Intervals of Waveform Intersecting Zero Axis>

The acceleration takes positive and negative values, and thus, the waveform of the acceleration SA intersects with a zero axis (axis in a time direction where the acceleration SA takes a value of zero) at certain timings as shown in FIG. 29 (in this case, a time interval of timings when the value of the acceleration SA changes from positive to negative is focused on). As in the case of the time intervals between the peak values of the waveform described above, the time intervals of intersection of the waveform of the acceleration SA with the zero axis are dependent on a state of congestion on a road. Accordingly, the time intervals of intersection of the waveform of the acceleration SA with the zero axis may be used as the index value for estimating the congestion degree C. In this case, for example, the shorter the time interval of timings when the waveform of the acceleration SA intersects with the zero axis, the larger the value of the congestion degree C. calculated by the congestion degree calculating means 144. Moreover, the greater the irregularity in the time intervals of timings when the waveform of the acceleration SA intersects with the zero axis, the larger the congestion degree C. calculated by the congestion degree calculating means 144.

<6.2.6 Speed>

Generally, speed can be determined by integration of acceleration. When a person is walking in a congested area, walking speed is low, and when the person is walking in a non-congested area, the walking speed is high. Accordingly, speed calculated by integrating the acceleration SA may be used as the index value for estimating the congestion degree C. In this case, the lower the speed, the larger the value of the congestion degree C. calculated by the congestion degree calculating means 144.

<6.3 Modifications Regarding Sensor Used in Estimation of Congestion Degree>

In the embodiment described above, the congestion degree C. is calculated based on the acceleration SA obtained by the acceleration sensor 18b (acceleration measuring means 110). However, the present invention is not limited to such a case. That is, a sensor that is used in estimation of the congestion degree is not limited to the acceleration sensor 18b. In the following, various modifications regarding a sensor that is used in the estimation of the congestion degree will be described.

<6.3.1 Gyro Sensor>

A gyro sensor is a sensor for detecting angular velocity. A state of rotation of a body and a state of twisting of the body are considered to be different for when a person is walking in a congested area and when the person is walking in a non-congested area. Accordingly, a scale of walking motion of a person can be grasped from information about the angular velocity. The scale of walking motion is dependent on a state of congestion on a road. Accordingly, estimation of the congestion degree may be performed based on the information about the angular velocity. That is, the gyro sensor may be used as the sensor for estimating the congestion degree.

In the case where the gyro sensor is used as the sensor for estimating the congestion degree, as the index values for estimating the congestion degree, a standard deviation of the angular velocity, the number of times the angular velocity exceeds a threshold during a predetermined period of time, an average value of absolute values of the angular velocity, a maximum value of the angular velocity, a minimum value of the angular velocity, time intervals between peak values of a waveform of the angular velocity, and time intervals of intersection of the waveform of the angular velocity with the zero axis may be adopted.

<6.3.2 Geomagnetic Sensor>

The geomagnetic sensor 18c (see FIG. 2) acquires the azimuth information BI indicating an azimuth the portable terminal device 10 is facing. A state of rotation of a body on a horizontal plane is considered to be different for when a person is walking in a congested area and when the person is walking in a non-congested area. Accordingly, a scale of walking motion of a person can be grasped from a change in the azimuth information BI. The scale of walking motion is dependent on a state of congestion on a road. Accordingly, estimation of the congestion degree may be performed based on the azimuth information BI. That is, the geomagnetic sensor 18c may be used as the sensor for estimating the congestion degree.

In the case where the geomagnetic sensor 18c is used as the sensor for estimating the congestion degree, as the index values for estimating the congestion degree, a standard deviation of the azimuth information BI (output value), and time intervals between peak values of a waveform of the azimuth information BI (output value) may be adopted.

<6.3.3 Altimeter>

An altimeter is a sensor for detecting height. A state of vertical movement of a body is considered to be different for when a person is walking in a congested area and when the person is walking in a non-congested area. Accordingly, a scale of walking motion of a person can be grasped from information about the height. The scale of walking motion is dependent on a state of congestion on a road. Accordingly, estimation of the congestion degree may be performed based on the information about the height. That is, the altimeter may be used as the sensor for estimating the congestion degree. In the case where the altimeter is used as the sensor for estimating the congestion degree, as the index values for estimating the congestion degree, a standard deviation of the height, and time intervals between peak values of a waveform of the height may be adopted.

<6.3.4 Pedometer>

A pedometer (passometer) is a sensor for counting the number of steps of a person. By inputting in advance information about a length of a step, a traveling distance of a person in a certain period of time may be estimated from the number of steps in the certain period of time. Moreover, because the traveling distance in a certain period of time can be estimated, speed may also be estimated. The speed (walking speed of a person) is dependent on a state of congestion on a road. Accordingly, estimation of the congestion degree may be performed based on information about the number of steps. That is, the pedometer may be used as the sensor for estimating the congestion degree. In the case where the pedometer is used as the sensor for estimating the congestion degree, the speed may be adopted as the index value for estimating the congestion degree.

<6.3.5 GPS Sensor>

The GPS sensor 18a acquires positional information (information about latitude/longitude) for identifying a current position (see FIG. 2). A traveling distance of a person in a predetermined period of time can be estimated from a change in the positional information in the predetermined period of time. Moreover, because the traveling distance in a predetermined period of time can be estimated, speed can also be estimated. The speed (walking speed of a person) is dependent on a state of congestion on a road. Accordingly, estimation of the congestion degree may be performed based on the positional information (information about latitude/longitude). That is, the GPS sensor 18a may be used as the sensor for estimating the congestion degree. In the case where the GPS sensor 18a is used as the sensor for estimating the congestion degree, the speed may be adopted as the index value for estimating the congestion degree.

It should be noted that, in the case of using the GPS sensor 18a as the sensor for estimating the congestion degree, frequency (update frequency) of change in the positional information in a predetermined period of time or a time interval of changes in the positional information may be adopted as the index value for estimating the congestion degree. Details are given below. One piece of positional information which is obtained by the GPS sensor 18a is data that is associated with a region having a certain size. A value of the positional information changes when such a region is crossed. Accordingly, when focusing on a certain period of time, the update frequency of the value of the positional information in the predetermined period of time changes depending on moving speed. The moving speed is dependent on a state of congestion on a road. Accordingly, the update frequency of the value of the positional information in a predetermined period of time may be adopted as the index value for estimating the congestion degree. Furthermore, when there is no movement, the value of the positional information is not changed. Therefore, the greater the congestion degree, the longer the time interval of changes in the value of the positional information. Accordingly, the time interval of changes in the value of the positional information may be adopted as the index value for estimating the congestion degree.

<7. Others>

Although the route guidance system has been described as an example in the embodiment described above, the present invention is not limited to such an example. The congestion degree and the number of people may be estimated by a system similar to the route guidance system, and estimation results may be used for various purposes. For example, information about the congestion degree and the estimated number of people may be used to change, in real time, deployment of security guards at the time of an event (fireworks events, concerts, various sports events, etc.).

Furthermore, although the route guidance system is realized by the server 20 and the portable terminal devices 10 in the embodiment described above, the present invention is not limited to such a case. A so-called wearable terminal such as a head mounted display (head-mount type display device) may be used instead of the portable terminal device 10.

Moreover, in the embodiment described above, the program for realizing the app is provided to the portable terminal device 10 and the like by being downloaded via a communication line such as the Internet. Regarding this, the program for realizing the app may be provided to the portable terminal device 10 and the like in a form stored in a computer-readable recording medium. The recording medium here is a non-transitory recording medium, for example. As the non-transitory recording medium, a CD-ROM, a DVD-ROM, and the like can be exemplified.

DESCRIPTION OF REFERENCE CHARACTERS

10: PORTABLE TERMINAL DEVICE
20: SERVER
110: ACCELERATION MEASURING MEANS
120: AZIMUTH DETECTING MEANS
130: MOTION DETERMINING MEANS
140: CONGESTION DEGREE ESTIMATING MEANS
142: STANDARD DEVIATION CALCULATING MEANS
144: CONGESTION DEGREE CALCULATING MEANS
220: AVERAGE CONGESTION DEGREE CALCULATING MEANS
230: NUMBER-OF-PEOPLE CALCULATING MEANS
240: NUMBER-OF-PEOPLE SMOOTHING MEANS
BI: AZIMUTH INFORMATION
BN: BASE NUMBER OF PEOPLE
C: CONGESTION DEGREE
CAV: AVERAGE CONGESTION DEGREE
NP1: ESTIMATED NUMBER OF PEOPLE (BEFORE SMOOTHING PROCESS)
NP2: ESTIMATED NUMBER OF PEOPLE (AFTER SMOOTHING PROCESS)
SA: ACCELERATION
SD: STANDARD DEVIATION (OF ACCELERATION)

The invention claimed is:

1. A congestion degree estimation method comprising:
an acceleration information outputting step of measuring, by an acceleration sensor, acceleration based on movement of a portable terminal device caused by motion of a user and outputting acceleration information based on the measured acceleration;
an index value acquiring step of acquiring, by a CPU of a computer included in the portable terminal device, based on the acceleration information, an index value for estimating a congestion degree;
a congestion degree calculating step of directly calculating, by the CPU of the computer, the congestion degree from the index value acquired in the index value acquiring step; and
a notifying step of notifying the user of congestion information, by displaying the congestion information on a display, based on the congestion degree calculated in the congestion degree calculating step,
wherein the index value is a normalized standard deviation of acceleration based on the acceleration information acquired at a predetermined period immediately before calculating the congestion degree, and
wherein in the congestion degree calculating step, the congestion degree is calculated by subtracting the normalized standard deviation as the index value from 1.

2. The congestion degree estimation method according to claim 1, wherein the index value acquiring step includes a normalization step of determining, by the CPU of the computer, the normalized standard deviation as the index value, by performing a predetermined normalization process on a standard deviation of acceleration obtained based on the acceleration information.

3. The congestion degree estimation method according to claim 2, further comprising a normalization preparation step of acquiring, by the CPU of the computer, a plurality of standard deviations of acceleration based on the acceleration information over a predetermined period of time before execution of the index value acquiring step, wherein
in the normalization step, the normalization process is performed based on a maximum value of the plurality of standard deviations acquired in the normalization preparation step.

4. The congestion degree estimation method according to claim 1, wherein, in the congestion degree calculating step, the congestion degree is calculated in such a way that the smaller the normalized standard deviation as the index value, the larger the congestion degree.

5. The congestion degree estimation method according to claim 1, further comprising a motion determining step of determining, by the CPU of the computer, based on sensor information, whether the user is walking or not, wherein
acquisition of the index value in the index value acquiring step and calculation of the congestion degree in the congestion degree calculating step are performed only when the user is determined to be walking in the motion determining step.

6. A number-of-people estimation method comprising:
an acceleration information outputting step of measuring for each of a plurality of portable terminal devices, by an acceleration sensor of the portable terminal device, acceleration based on movement of the portable terminal device caused by motion of a user and outputting acceleration information based on the measured acceleration;

a congestion degree estimating step of estimating a congestion degree for each of the plurality of portable terminal devices based on the acceleration information of the portable terminal device;

an average congestion degree calculating step of calculating, by a CPU of a computer, an average congestion degree for each of a plurality of reference ranges set in advance, based on the congestion degrees estimated in the congestion degree estimating step for the plurality of portable terminal devices;

an estimated number-of-people calculating step of calculating, by the CPU of the computer, an estimated number of people for each of the plurality of reference ranges by multiplying the average congestion degree calculated in the average congestion degree calculating step by a maximum number of accommodated people determined in advance for the reference range; and a notifying step of notifying a user of congestion information, by displaying the congestion information on a display, based on the estimated number of people calculated in the estimated number-of-people calculating step.

7. The number-of-people estimation method according to claim 6, further comprising an estimated number-of-people correcting step of correcting, by the CPU of the computer, the estimated number of people calculated in the estimated number-of-people calculating step, by using a correction filter storing a coefficient group associated with one reference range and reference ranges surrounding the one reference range.

8. The number-of-people estimation method according to claim 7, wherein, with respect to the correction filter, a value of a coefficient associated with a reference range at a center is greater than values of coefficients associated with reference ranges surrounding the reference range at the center.

9. The number-of-people estimation method according to claim 8, wherein, provided that a reference range where there is data about the congestion degree is defined as a calculation target reference range, a certain reference range that is the calculation target reference range is defined as a correction target reference range, a coefficient stored in the correction filter is defined as a filter coefficient, and a value that is obtained by multiplying an estimated number of people before correction for a certain reference range by a filter coefficient that is associated with the certain reference range is defined as a first multiplied value, an estimated number of people after correction for the correction target reference range is calculated in the estimated number-of-people correcting step by a following equation:

NP2=Sum1/Sum2, where NP2 represents the estimated number of people after correction for the correction target reference range, Sum1 represents a sum of first multiplied values of the correction target reference range and calculation target reference ranges surrounding the correction target reference range, and Sum2 represents a sum of respective filter coefficients associated with the correction target reference range and the calculation target reference ranges surrounding the correction target reference range.

10. A non-transitory tangible computer-readable recording medium having recorded therein a congestion degree estimation program for causing a CPU of a computer to execute, by using a memory:

an acceleration information outputting step of causing an acceleration sensor to measure acceleration based on movement of a portable terminal device caused by motion of a user and output acceleration information based on the measured acceleration;

an index value acquiring step of acquiring, based on the acceleration information, an index value for estimating a congestion degree;

a congestion degree calculating step of directly calculating the congestion degree from the index value acquired in the index value acquiring step; and a notifying step of notifying the user of congestion information, by displaying the congestion information on a display, based on the congestion degree calculated in the congestion degree calculating step, wherein the index value is a normalized standard deviation of acceleration based on the acceleration information acquired at a predetermined period immediately before calculating the congestion degree, and wherein in the congestion degree calculating step, the congestion degree is calculated by subtracting the normalized standard deviation as the index value from 1.

11. The non-transitory tangible computer-readable recording medium according to claim 10, wherein the index value acquiring step includes a normalization step of determining the normalized standard deviation as the index value, by performing a predetermined normalization process on a standard deviation of acceleration obtained based on the acceleration information.

12. The non-transitory tangible computer-readable recording medium according to claim 11, wherein
the congestion degree estimation program further comprises a normalization preparation step of acquiring a plurality of standard deviations of acceleration based on the acceleration information over a predetermined period of time before execution of the index value acquiring step, and
in the normalization step, the normalization process is performed based on a maximum value of the plurality of standard deviations acquired in the normalization preparation step.

13. The non-transitory tangible computer-readable recording medium according to claim 10, wherein, in the congestion degree calculating step, the congestion degree is calculated in such a way that the smaller the normalized standard deviation as the index value, the larger the congestion degree.

14. The non-transitory tangible computer-readable recording medium according to claim 10, wherein
the congestion degree estimation program further comprises a motion determining step of determining, based on sensor information, whether the user is walking or not, and
acquisition of the index value in the index value acquiring step and calculation of the congestion degree in the congestion degree calculating step are performed only when the user is determined to be walking in the motion determining step.

15. A non-transitory tangible computer-readable recording medium having recorded therein a number-of-people estimation program executed by a server in a number-of-people estimation system where the server and a plurality of portable terminal devices are connected by a network, the program being for causing a CPU of a computer to execute, by using a memory:

a data receiving step of receiving data about a congestion degree transmitted from each of the plurality of portable terminal devices;

an average congestion degree calculating step of calculating an average congestion degree for each of a plurality reference ranges set in advance, based on the data about the congestion degree received in the data receiving step;

an estimated number-of-people calculating step of calculating an estimated number of people for each of the plurality of reference ranges by multiplying the average congestion degree calculated in the average congestion degree calculating step by a maximum number of accommodated people determined in advance for the reference range; and a notifying step of notifying a user of congestion information, by sending the congestion information to a portable terminal device carried by the user, based on the estimated number of people calculated in the estimated number-of-people calculating step.

16. A number-of-people estimation system where a server and a plurality of portable terminal devices are connected by a network, wherein each of the plurality of portable terminal devices includes
an acceleration sensor configured to measure acceleration based on movement of the portable terminal device caused by motion of a user and output acceleration information based on the measured acceleration, an index value acquiring means configured to acquire, based on the acceleration information, an index value for estimating a congestion degree, a congestion degree calculating means configured to directly calculate the congestion degree from the index value acquired by the index value acquiring means, and a data transmitting means configured to transmit, to the server, data about the congestion degree calculated by the congestion degree calculating means, and the server includes
a data receiving means configured to receive the data about the congestion degree transmitted by the data transmitting means of each of the plurality of portable terminal devices, an average congestion degree calculating means configured to calculate an average congestion degree for each of a plurality of reference ranges set in advance, based on the data about the congestion degree received by the data receiving means, and an estimated number-of-people calculating means configured to calculate an estimated number of people for each of the plurality of reference ranges by multiplying the average congestion degree calculated by the average congestion degree calculating means by a maximum number of accommodated people determined in advance for the reference range, wherein the server notifies a user of congestion information, by sending the congestion information to a portable terminal device carried by the user, based on the estimated number of people.

* * * * *